(12) United States Patent
Hanson et al.

(10) Patent No.: US 8,434,472 B2
(45) Date of Patent: May 7, 2013

(54) SOLAR COLLECTOR WITH NON-HONEY SANDWICH CORE

(75) Inventors: Gordon N. Hanson, Foster City, CA (US); Fabien Ebnoether, Gelterkinden (CH); Clifford Delmage, Theodore, AL (US)

(73) Assignee: CellTech Metals, Inc., San Diego, CA (US)

( * ) Notice: Subject to any disclaimer, the term of this patent is extended or adjusted under 35 U.S.C. 154(b) by 0 days.

(21) Appl. No.: 12/569,653

(22) Filed: Sep. 29, 2009

(65) Prior Publication Data

US 2011/0073102 A1 Mar. 31, 2011

(51) Int. Cl.
*F24J 2/38* (2006.01)
(52) U.S. Cl.
USPC ........... 126/601; 126/696; 126/692; 126/684; 126/680; 126/681; 126/683; 126/600

(58) Field of Classification Search ............... 126/601, 126/696, 692, 684, 680, 681, 683, 600
See application file for complete search history.

(56) References Cited

U.S. PATENT DOCUMENTS

| | | | | |
|---|---|---|---|---|
| 4,178,913 A | * | 12/1979 | Hutchison | 126/601 |
| 4,875,766 A | * | 10/1989 | Shimodaira et al. | 359/883 |
| 5,609,942 A | * | 3/1997 | Ray | 428/182 |
| 6,035,850 A | * | 3/2000 | Deidewig et al. | 126/696 |
| 2007/0243408 A1 | * | 10/2007 | Straza | 428/687 |

* cited by examiner

*Primary Examiner* — Avinash Savani
(74) *Attorney, Agent, or Firm* — Paul Davis; Goodwin Procter LLP

(57) ABSTRACT

An apparatus is provided for the collection and conversion of light energy. The apparatus includes, a sandwich core structure, a collector element and a concentrator including one or more reflector elements and positioned at an exterior surface of the sandwich core structure.

17 Claims, 23 Drawing Sheets

Limitations on the Uni-directionally Corrugated Architecture

Drawing of unidirectional; corrugated core architecture with face sheets $$\rho^* = \frac{(w + \frac{h_l}{\sin\alpha})t}{(w + \frac{h}{\tan\alpha})(h_l + t)}$$

Restriction #1: $0.01 < \rho^* < 0.2$

Restriction #2: $w \leq \frac{h_l}{2}$

A
Different view of the uni-directionally corrugated core architecture

Limitations on the Bi-directionally Corrugated Core Architectures for Solar Applications

Schematic top view

Side view after forming

Restriction #1: $2 \geq D_2 / D_1 \geq 1$

Restriction #2: $2/3 > h/D > 1/3$ where $D = \min(D_1, D_2)$

Restriction #3: $0.01 < t_{initial}/(h+t_{initial}) < 0.2$

Top view

Side view 3D view

SOLAR COLLECTOR WITH NON-HONEY SANDWICH CORE

BACKGROUND

1. Field of the Invention

This invention relates generally to solar collector systems, and more particularly to solar collector systems that include sandwich core structures.

2. Description of the Related Art

Recent economic and political developments have resulted in a drastic increase in the cost of conventional energy sources such as crude oil, natural gas and the like. Due to the increased prices of conventional energy sources and because of the very real and potential shortages of conventional energy sources such as crude oil, natural gas and the like, many alternative sources of energy are being investigated. One particularly promising alternative source of energy is the recovery and use of solar radiation or "solar energy". While it has long been known that solar energy is a vast, untapped source of energy, conventional energy sources such as crude oil, natural gas and the like, have been so cheap that solar energy recovery could not be justified from an economic standpoint. Now, because of the changing economic conditions affecting conventional energy and because of possible shortages of such conventional energy, solar energy represents a viable source of energy.

Many types of solar collector systems have been investigated. Such solar collector systems include tubes, mats and other large surface area solar collectors that contain some type of working fluid that is heated by merely placing such large solar collectors in the sun. Such solar collectors are effective in heating the working fluids only a few degrees above ambient temperature. Additionally, such large solar collectors are relatively expensive.

The use of highly reflective surfaces or mirror-type surfaces are very effective for gathering solar radiation striking a relatively large effective area and focusing or concentrating the radiation onto a relatively small target area or energy receiver. Such types of solar collectors include a collection of many individual flat mirrors that can be focused onto one small target or energy collector, as well as various types of curved and shaped reflective surfaces that will focus the collected solar energy onto a relatively small surface or energy receiver.

One particularly preferred type of solar collector is a parabolic reflector which will gather solar radiation and reflect the radiation onto a small target or energy receiver which is located at the focal point of the parabola. Because of the relatively high cost of constructing a true parabolic surface, parabolic reflectors are not widely used for low cost energy recovery from the sun.

Trough-like reflectors have been investigated as relatively low cost types of solar collectors. The trough-like reflectors have proven to be much less expensive to manufacture than true parabolic reflectors. Some of the most effective trough-like reflectors utilize a relatively large reflector surface that is formed by constructing an elongated trough-like device with the walls of the trough having a constant parabolic shape whereby the focal point of the parabolic trough lies along a relatively straight line above the trough. Thus, the concave trough-like solar collector can be equipped with a target or energy receiver that is disposed along the line formed by the focal point of the parabolic reflector. By using such a reflector, solar radiation which strikes the concave surface of the solar collector will be reflected and concentrated onto the focal point of the parabola and can be captured by an energy receiver located at or near the focal point of the parabolic surface.

There is a need for improved solar collector systems that are more cost effective, are easier to install, can be installed in a variety of different locations and have lower weight that eliminates or reduces the need for frames, ribs and the like. With the present invention, the structure is sufficiently strong that it does not need additional support elements.

SUMMARY OF THE INVENTION

An object of the present invention is to provide an improved solar collector system.

Another object of the present invention is to provide a solar collector system that includes a core structure.

A further object of the present invention is to provide a solar collector system that is more cost effective and easier to install.

Yet another object of the present invention is to provide a solar collector system with a core structure that requires minimal or no additional support elements.

Another object of the present invention is to provide an improved solar collector system with a core structure that be readily installed at a variety of different types of locations.

A further object of the present invention is to provide a solar collector system that includes a core structure which eliminates or reduces the need for frames, ribs and the like.

These and other objects of the present invention are achieved an apparatus for the collection and conversion of light energy. The apparatus includes, a sandwich core structure, a collector element and a concentrator including one or more reflector elements and positioned at an exterior surface of the sandwich core structure.

DESCRIPTION OF THE DRAWINGS

FIG. 24b is a cross-sectional view of the structure depicted in FIG. 24a.

FIG. 26b is a cross-sectional view of the sandwich structure depicted in FIG. 18a.

FIG. 29b is a cross-sectional view of the nozzle system depicted in FIG. 29a.

DESCRIPTION OF PREFERRED EMBODIMENTS

The present invention provides a solar collector, and solar collector system, that has a core structure that is coupled to or includes a reflective surface to collect and focus solar energy. A formable sandwich sheet material is provided that can include a core structure positioned between first and a second sheets. The sandwich sheet material includes at least one or more corrugated layers. Each corrugated layer has a periodic array of discrete cells positioned along either multiple directions of corrugation or a single direction of corrugation. Each discrete cell has a bonding land. When the core structure is composed of at least two corrugated layers, all corrugated layers are parallel and stacked on top of each other. A plurality of the bonding lands on the upwardly projecting cells of each corrugated layer are bonded to a plurality of the bonding lands on the downwardly projecting cells of the adjacent upper corrugated layer. When there are dimples and channels, the dimples and channels interlock with corresponding bonding lands of a cell of an adjacent corrugated core layer. The first sheet layer is bonded to the bottom of the core structure. The second sheet layer is bonded to the top of the core structure. The first and second sheet layers and the at least one corrugated layer of the core structure are parallel relative to each other and create the sandwich sheet material that is formable and has an open cellular core structure.

With the present invention, the use of the core structure the solar collector system, (i) is more cost effective and easier to install, (ii) has minimal or does not requires additional support elements, (iii) can be readily installed at a variety of different types of locations and (iv) eliminates or reduces the need for frames, ribs and the like because of the strength and weight of the core structure.

In another embodiment, the present invention provides new core structures that can be used for a variety of applications.

Figure 1:
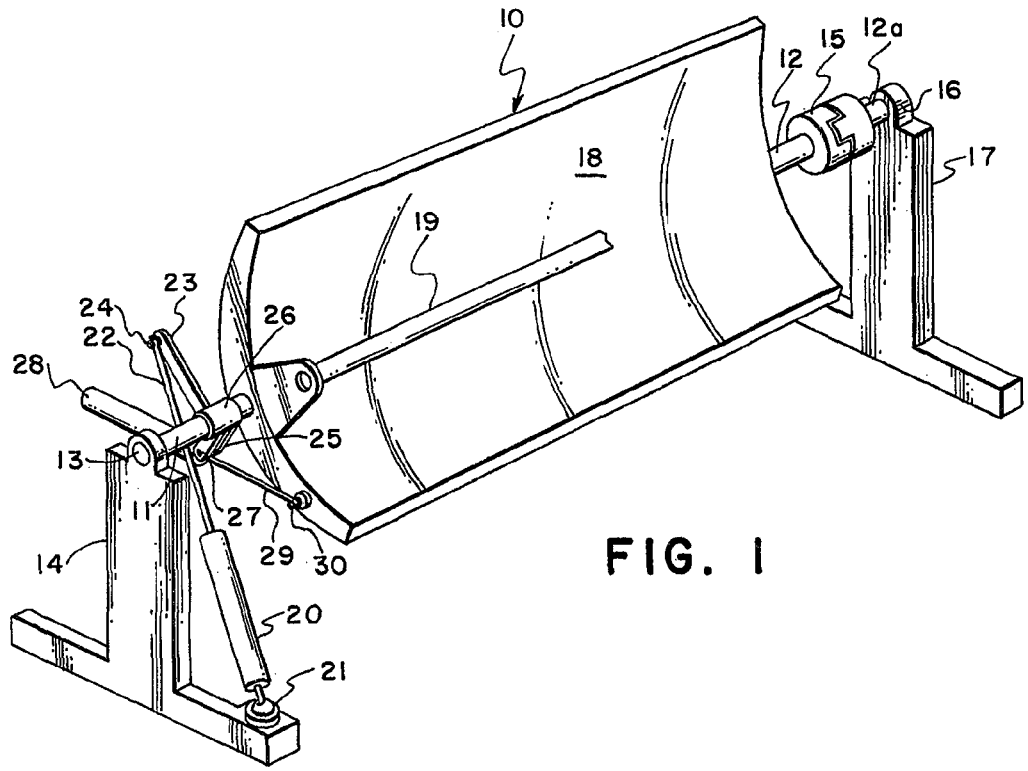
FIG. 1 is a perspective view of a solar collector system in accordance with the present invention with the hydraulic hoses and a portion of the collector tube being removed.

FIG. 1 illustrates a solar collector system in accordance with the present invention. A solar collector panel 10 is provided. Optionally include are support by axles 11 and 12. Axles 11 and 12 can be any suitable rigid structure that will support the weight of solar collector panel 10. Any known method for constructing solar collector panel 10 can be utilized to produce the desired collector surface. It will be appreciated that due to the strength and characteristics of the core structures that axles 11 and 12 may not be needed.

After the core structure is created, the reflectorized surface is formed on the structure. In one embodiment, a thin substrate, that is reflective, is bonded to an exterior surface of core structure. The surface of the core structure is sufficiently smooth to provide for effective reflectivity and is substantially uniform in its surface to again provide for effective reflectivity.

Rotation axle 11 is journaled into a suitable bearing device 13 which is supported by and carried by support pylon 14. Rotation axle 12 is rigidly affixed to one-half of universal joint 15. The other half of universal joint 15 is affixed to rotation axle 12a. Rotation axle 12a is journaled into bearing device 16 which is carried and supported by support pylon 17.

As illustrated in FIG. 1, solar collector panel 10 can be a trough-like solar collector having a concave reflectorized surface 18. However, the present invention is not limited to this geometry and other geometries are suitable. By properly shaping reflectorized surface 18, including but not limited to a concave trough-like shape in the form of a parabola, solar radiation striking the reflectorized surface will be reflected back toward the focal point of the reflectorized surface.

A collector tube 19 can be positioned along the line formed by the focal point of the reflectorized surface. Essentially all of the solar radiation striking highly reflectorized surface 18 will be reflected back to a focal point which is occupied by collector tube 19. Suitable working fluids can be pumped through collector tube 19 to gather the solar energy in the form of sensible heat. A suitable device for pumping the working fluid through collector tube 19 are well known in the art and are not illustrated in FIG. 1.

For maximum efficiency and recovery of solar energy with the solar collector system shown in FIG. 1, it is desired to point the reflectorized surface 18 directly toward the sun. In other words, it is desired to have the axis of the parabolic surface pointed directly toward the sun at all times. Since the sun, of course, traverses the sky during the day, in order to keep the parabolic reflectorized surface pointed directly toward the sun, it will be necessary that the reflectorized surface be rotated about the axis of rotation axles 11 and 12. In order to accomplish this, rotation axles 11 and 12a must be rotatably journaled into bearing or bushing device 13 and 16.

If the collector panels are very large, support pylons 14 and 17 can optionally be included and positioned a considerable distance apart. However, pylons 14 and 17 may not be necessary due to the characteristics of the core structure. Because it is highly desirable to have a solar collector panel that can be freely and easily rotated with minimum power consumption for the rotation, bearing device 13 and 16 can be closely aligned to receive rotation axles 11 and 12a.

Figure 2:
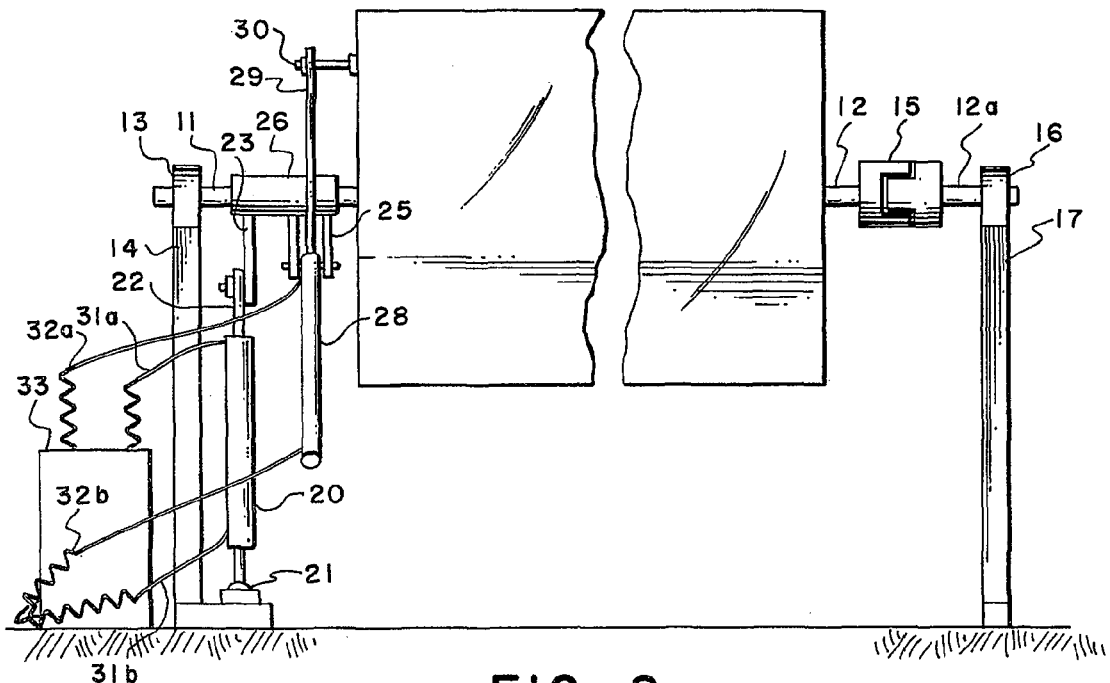
FIG. 2 is an elevational view of the solar collector system of this invention showing the back side of the solar collector surface with a portion of the middle of the solar collector surface being removed.

In one embodiment, misalignment of bearing device and rotation axles can be alleviated by the incorporation of at least one load bearing universal joint in the rotation axle of the solar collector panel. As illustrated in FIG. 1 and FIG. 2, universal joint 15 can be incorporated into rotation axle 12 and the free end of rotation axle 12 is rigidly affixed to one-half of universal joint 15 and the other half of universal joint 15 is affixed to rotation axle 12a. Rotation axle 12a is then journaled into bearing device 16 which is affixed to and carried by the upper portion of support pylon 17. With the incorporation of load bearing joint 15 into the rotation axle, any reasonable shifting and misalignment of bearing device 16 with bearing device 13 will be compensated for. Universal joint 15 can serve as an angular misalignment compensator to allow solar collector panel 10 to be freely rotated even when bearing device 13 and 16 are shifted and displaced from their normally aligned orientation. It will be appreciated that more than one universal joint can be placed in the rotation axles of the solar collector panel. If desired, an additional load bearing universal joint can also be placed in rotation axle 11 to provide additional angular misalignment compensation if there is severe misalignment of the bearing device.

With the present invention, load bearing U-joints can be used compensate for angular misalignment of the bearing device with the axle device, and utilized to mount support pylons 14 and 17 on surfaces that would normally be unacceptable for mounting solar collector panels.

In one embodiment of the present invention, orientation of the solar collector panel can be achieved with a hydraulic system that incorporates at least two hydraulic cylinders with related pistons and piston rods. A primary cylinder, piston and piston rod is utilized to position a secondary cylinder, piston and piston rod. The primary cylinder, piston and piston rod is operably connected to the support structure and a rotation collar device. The secondary piston, cylinder and piston rod is operably supported by the rotation collar. The secondary cylinder or terminal end of the secondary piston rod is affixed to a portion of the solar collector panel whereby movement of hydraulic fluid into or out of the secondary cylinder will cause rotation of the solar collector panel about its rotation axis. It will be appreciated that the hydraulic cylinders may not be required.

As shown in FIGS. 1 through 5, the lower end of primary cylinder 20 is pivotally affixed to a portion of support pylon 14 at pivot point 21. The upper free end of primary piston rod 22 is affixed to primary rotating arm 23 at pivot point 24. Primary rotating arm 23 is rigidly affixed to secondary rotating arm 25. As can be more clearly seen in FIGS. 3 through 5, primary rotating arm 23 and secondary rotating arm 25 are rigidly affixed to rotation collar 26. Rotation collar 26 has a round bore with rotating axle 11 passing through the bore in such a manner that rotating collar 26 is free to rotate around rotation axle 11. Affixed to the terminal end of secondary rotating arm 25 at pivot point 27 is secondary cylinder 28. Secondary piston rod 29 is affixed to solar collector panel 10 at pivot point 30.

Figure 4:
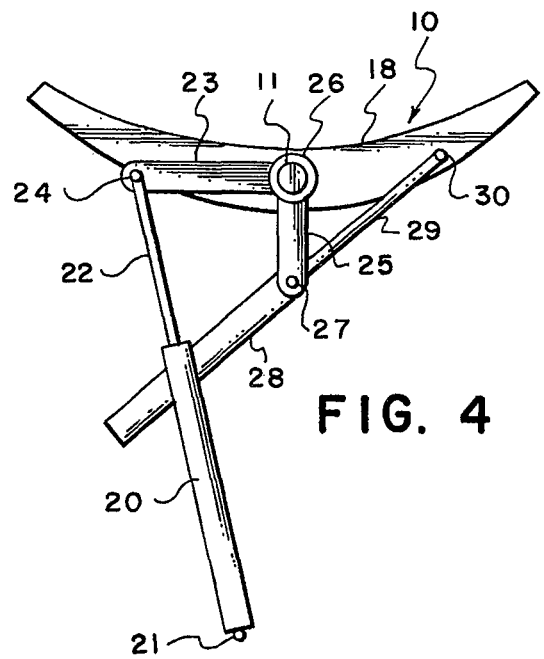
FIG. 4 is a side elevational view of a portion of the solar collector system of this invention with the solar collector surface pointing directly skyward.
Figure 5:
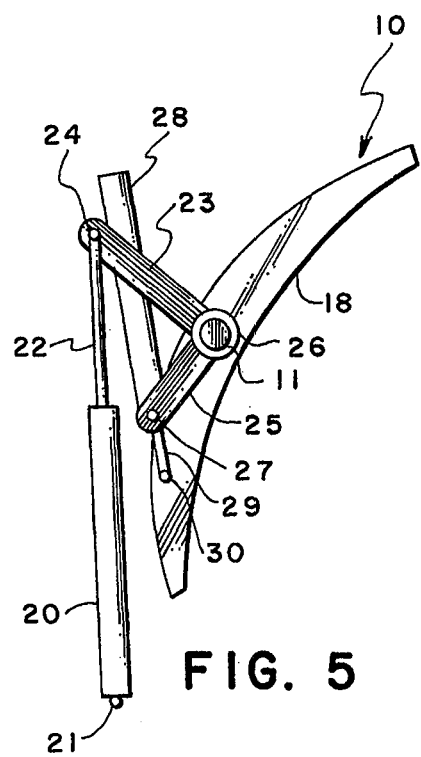
FIG. 5 is a side elevational view of a portion of the solar collector system of this invention showing the relative orientation of the primary and secondary cylinder and piston device with the surface of the solar collector being in a stow position.
Figure 3:
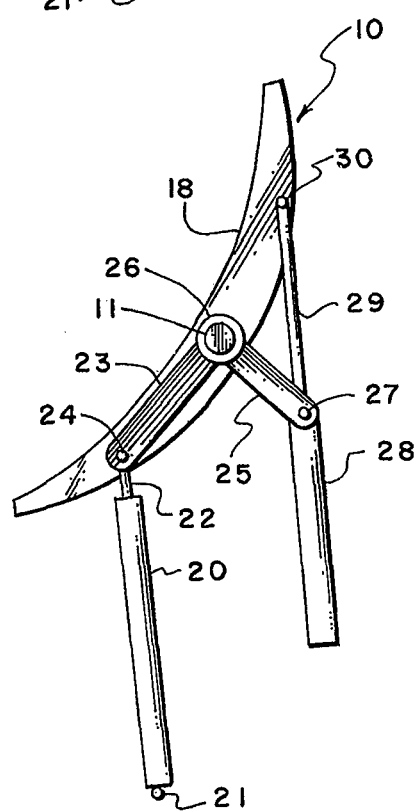
FIG. 3 is a side elevational view of a portion of the solar collector system of this invention showing the orientation of the primary and secondary piston and cylinder device as they would be oriented when the collector surface is in the position shown in FIG. 2 as viewed from the left of FIG. 2.

FIG. 3, FIG. 4 and FIG. 5 are end views of a portion of the solar collector system illustrated in FIG. 1. In FIGS. 3, 4, and 5, support pylon 14 has been removed to more clearly illustrate the function and operation of the primary and secondary piston and cylinder device as they are utilized to position and move solar collector panel 10 from one tracking extreme to the other. As shown in FIGS. 3, 4 and 5, the axis of the solar collector panel can be oriented in a north-south line to track the sun from one horizon to the other as the sun traverses an east to west path. With the present invention the solar collectors can be oriented in either an east-west or north-south alignment.

As illustrated in FIG. 5, the present invention has the capability of rotating the solar collector panel to a point where the highly reflectorized surface of the solar collector panel no longer points toward the sky. As will be described hereinafter, the present invention can provide for high speed rotation of the solar collector panel from one tracking position to another. This high speed rotation is especially useful for moving the solar collector panel surfaces from a tracking mode to a stow mode in times of sudden storm and the like.

Referring to FIG. 3, the reflectorized surface 18 can be directed toward one horizon by utilizing primary piston and cylinder device 20 with the primary piston device being in a near fully collapsed position to withdraw primary piston rod 22 into the primary cylinder sleeve. As the primary piston rod 22 moves downwardly into primary cylinder device 20, the operable connection of primary piston rod 22 to primary rotating arm 23 will cause the terminal end of primary rotating arm 23 to move downwardly. As primary rotating arm 23 moves downwardly, such movement will cause rotation collar 26 to rotate about rotation axle 11 to thereby cause the terminal end of secondary rotating arm 25 to move upwardly. By virtue of the operable connection of secondary cylinder and piston device 28 to the end of secondary rotating arm 25 at pivot point 27, the entire secondary piston and cylinder device 28 will move upwardly. By then extending secondary piston rod 29 outwardly from secondary cylinder device 28, solar collector panel 10 will rotate about rotation axle 11 to the position shown in FIG. 4 by virtue of the pivotal connection of the terminal end of secondary piston rod 29 to solar collector panel 10 at pivot point 30. With the solar collector panel in the position illustrated in FIG. 3, movement of the solar collector panel is thereafter accomplished by either moving secondary piston rod 29 upwardly or downwardly by the selective injection and withdrawal of hydraulic fluid into or out of secondary cylinder 28. Additionally, movement of solar collector panel 10 can be accomplished by the selective injection and withdrawal of hydraulic fluid into and out of primary cylinder device 20 while maintaining the predetermined extension of secondary piston rod 29. As mentioned above, the lower end of primary cylinder device 20 is affixed to a suitable support or anchor structure, such as support pylon 14 at pivot point 21. Movement of a solar collector panel can be achieved by other devices and means.

FIG. 4 illustrates the relative positioning of the primary and secondary piston and cylinder device as solar collector panel 10 is oriented with reflectorized surface 18 pointing directly skyward. As will be illustrated by FIG. 4, primary piston rod 22 is extended approximately three-fourths of its length from primary cylinder device 20. With such extension, primary rotating arm 23 will be rotated upwardly from the position illustrated in FIG. 3. With the rotation of primary rotating arm 23 upwardly, secondary rotating arm 25 is rotated downwardly, thereby moving secondary cylinder and piston device 28 downwardly. With secondary piston rod 29 extended approximately three-fourths of its length from secondary cylinder device 28, the operable connection of the terminal end of secondary piston rod 29 to solar collector panel 10 at pivot point 30 will cause reflectorized surface 18 to be rotated skywardly. The relative positioning of reflectorized surface 18 can be very readily accomplished by the selective injection and withdrawal of hydraulic fluid into and out of either or both of primary cylinder device 20 and secondary cylinder device 28.

FIG. 5 illustrates the relative positioning of the piston and cylinder device when the solar collector panel is placed in a stow position. As shown in FIG. 5, primary piston rod 22 is in a near fully extended position to thereby cause primary rotating arm 23 to rotate upwardly about rotation axle 11. With such rotation, secondary rotating arm 25 is rotated downwardly to thereby cause secondary piston and cylinder device 28 to be rotated upwardly as illustrated. Then, by moving secondary piston rod 29 almost completely inwardly into secondary cylinder 28, reflectorized surface 18 is caused to rotate downwardly by virtue of the operable connection of the terminal end of secondary piston rod 29 to the solar collector panel at pivot point 30.

FIG. 2 illustrates one configuration of rotation collar 26 with primary rotating arm 23 and secondary rotating arm 25 being offset to allow the unhampered movement of the above-described primary and secondary cylinder and piston device. It will be appreciated that other configurations can also be utilized whereby the primary cylinder device and piston device are utilized to position the secondary piston and cylinder device to allow full rotation of the solar collector panel from one horizon to the opposite horizon.

It will also be appreciated that the operable connections of primary cylinder 20 and primary piston rod 22 can be reversed from the connections illustrated, whereby the terminal closed end of cylinder 20 can be affixed to rotation collar 26 at pivot point 24 and the terminal end of piston rod 22 can be affixed to the support device at pivot point 21. Likewise, secondary cylinder 28 can be affixed to solar collector surface 10 at pivot point 30 and the terminal end of secondary piston rod 29 can be connected to rotation collar 26 at pivot point 27. In the drawings, rotation collar 26 has been shown as surrounding axle device 11. While this is a preferred configuration, collar 26 can be supported in other ways such as by providing a separate rotation axle or pin which can be carried by support structure 14.

As shown in FIG. 2, primary hydraulic fluid lines 31a and 31b are in open communication with the portion of primary cylinder device 30 to allow the selective addition and withdrawal of hydraulic fluid to the cylinder device above and below the primary piston device disposed within the cylinder sleeve. Primary hydraulic fluid lines 31a and 31b are also in open communication with a suitable source of pressurized hydraulic fluid and the necessary control equipment to allow the selective addition and withdrawal of fluid from the primary cylinder device to cause the desired movement of the primary piston within the sleeve of the primary cylinder device. Likewise, secondary hydraulic fluid lines 32a and 32b are in communication with secondary cylinder device 28 and a source of pressurized hydraulic fluid with necessary controls to allow the desired addition and withdrawal of hydraulic fluid from secondary cylinder device 28, both above and below the secondary piston disposed within such cylinder sleeve. Housing 33 can be utilized to contain the source of hydraulic fluid and hydraulic fluid control device to allow the hydraulic fluid to be selectively injected and within drawn from the primary and secondary cylinder device. It will be appreciated that both primary and secondary hydraulic fluid lines 31a, 31b, 32a and 32b are preferably flexible tubing of sufficient length to allow the cylinder device to move as illustrated in FIGS. 3, 4 and 5.

Figure 6:
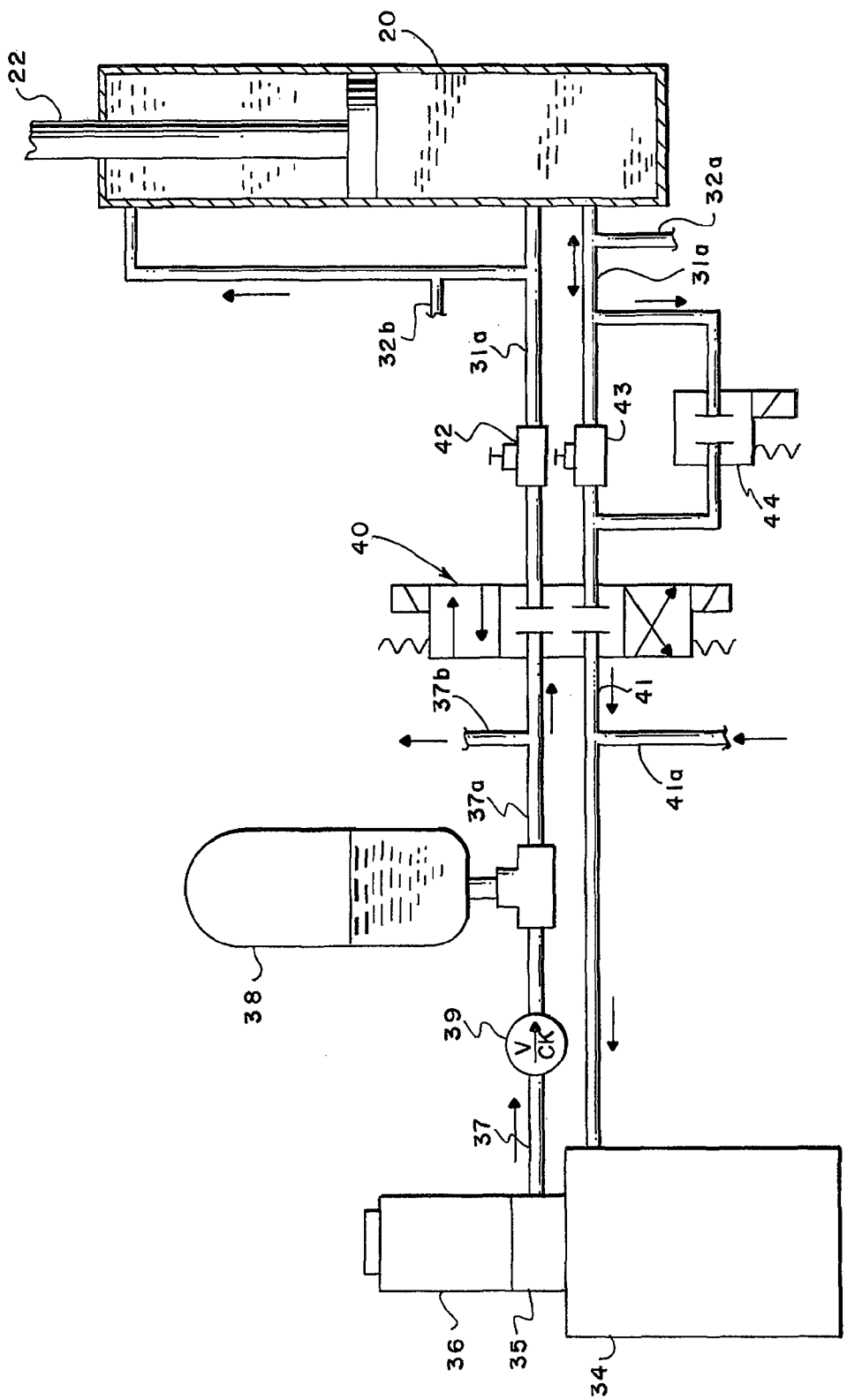
FIG. 6 is a schematic representation of the hydraulic system of this invention.

FIG. 6 is a schematic drawing of one hydraulic system that can be utilized in the present invention to selectively inject and withdraw hydraulic fluids from the hydraulic tracking system of this invention. As shown in FIG. 6, hydraulic fluid reservoir 34 is utilized to contain hydraulic fluid that is later supplied to the hydraulic system under pressure. Hydraulic fluid from hydraulic fluid reservoir 34 is pumped by device of pump 35 which is powered by a small, but efficient, motor device 36 through hydraulic fluid supply conduit 37 into hydraulic fluid accumulator 38. Hydraulic fluid accumulator 38 is utilized to supply the necessary pressurized fluid to the primary and secondary cylinder device. Pressure in hydraulic fluid accumulator 38 is maintained by any suitable device, such as by use of a compressable fluid, such as an inert gas being maintained within the accumulator along with the hydraulic fluid.

Thus, when a liquid hydraulic fluid is pumped into hydraulic fluid accumulator 38, the gaseous overhead will be compressed to thereby maintain the hydraulic fluid under pressure. In the present system, pressures of up to several thousand pounds per square inch are often utilized. It will be appreciated that the present system utilizes very small amounts of hydraulic fluid. Therefore, for a system that is utilized to operate one or more standard solar collector panels, the volume of the hydraulic fluid accumulator can be as little as one or two gallons. In such instances, the pressure of the hydraulic fluid will be maintained at several hundred pounds per square inch.

It is not necessary for pump device 35 to run continuously. In fact, one of the highly desirable features of this invention is the design of a system wherein pump device 35 can be operated by a relatively small but efficient motor device 36 to pump hydraulic fluid from reservoir 34 into accumulator 38 intermittently. It is not necessary and, in fact, is not desired, to have motor device 36 to run continuously. In many instances, sufficient hydraulic fluid can be pumped in a very energy efficient manner into accumulator 38 by having the motor device run only for a few minutes at different times during the tracking day.

The motor device utilized of the present invention can be controlled by a suitable pressure switch (not shown) which can be disposed in hydraulic accumulator 38. Thus, when the pressure within the accumulator falls to a certain predetermined set point, the motor device can be activated and it will run until the pressure within accumulator 38 rises to a predetermined desired level, at which time motor device 36 will be stopped.

A check valve 39 can be included in hydraulic supply conduit 37 to prevent the pressurized hydraulic fluid from exerting a back pressure on pump device 35 when it is not running. Pressurized hydraulic fluid from accumulator 38 can be selectively injected into the hydraulic cylinders through either hydraulic fluid lines 31a or 31b. The control of fluid flowing through these hydraulic fluid lines can be controlled by any suitable device which will selectively control the hydraulic fluid flow in response to a signal which can be generated by any known device. Tracking sensors for tracking the sun as it traverses the sky are well known in the art.

As a non-limiting example, a shadow bar tracking sensor can be used that tracks the sun by device of a photoelectric cell and a shadow bar to generate signals that will actuate the present hydraulic tracking system. Additionally, tracking may be accomplished by other device such as by computer generated signals, mechanical timers, manual tracking device and the like. The exact type of sensor utilized to give signals to the present hydraulic system does not form a part of this invention. Any known device for generating such signals can be utilized with the present invention.

In one embodiment, a control apparatus that can be utilized in the present invention can be to utilize a three-position, four-way solenoid control valve. Thus, pressurized hydraulic fluid from accumulator 38 can be supplied to a three-position, four-way solenoid valve 40 through hydraulic supply conduit 37a. The three-position, four-way solenoid control valve is a well known valve device which allows incoming fluid to be directed to either of two other conduits which are in open communication with the valve device. The center position of the three-position, four-way solenoid valve is normally in an off position whereby fluid flow is completely interrupted in the hydraulic conduits. When the valve is in the "off" position, the apparatus can be in a hydraulic lock mode and the solar collector panel can be locked into position. Thus, valve 40 can be utilized to direct the pressurized hydraulic fluid from supply conduit 37a into either hydraulic fluid lines 31a or 31b or to totally interrupt flow of the fluid through the conduits. The exact selection of which of hydraulic fluid lines 31a or 31b which will receive the pressurized hydraulic fluid can be controlled by the proper positioning of the solenoid valve, which will be controlled by the known tracking sensor, mentioned above.

The four-way solenoid valve also provides for the hydraulic fluid which can be withdrawn from the cylinder device through either hydraulic supply conduits 31a or 31b to be directed back through the valve to exit into hydraulic fluid return conduit 41 which will then return the fluid to reservoir 34. Thus, the three-position solenoid valve can be utilized to direct the pressurized hydraulic fluid into either hydraulic fluid lines 31a or 31b with the fluid being withdrawn from the cylinder being withdrawn through the other of these supply conduits and directed back through return conduit 41.

In one embodiment, the rate of movement of the piston device within the above-described cylinder device can be controlled by the flow of the pressurized hydraulic fluid into the cylinder device. Therefore, directional flow control valve 42 can be disposed in hydraulic fluid line 31a to control the rate of flow of the pressurized hydraulic fluid into the top portion of the cylinder device. Likewise, flow control valve 43 can be disposed in hydraulic fluid line 31b to control the flow rate of pressurized hydraulic fluid into the lower portion of hydraulic cylinder 20. Preferably, flow control valves 42 and 43 control the rate of flow in only one direction with free flow of the fluid in the other direction.

By properly adjusting the flow rates which are controlled by flow control valves 42 and 43, the tracking rate of the system can be very precisely controlled whereby actuation of the solenoid valve 40 for a predetermined period of time will cause movement of the solar collector panel to the desired degree. Normally, tracking rates will be quite slow with the flow rate of the hydraulic fluid through hydraulic fluid conduits 31a and 31b being very small.

It may be desired to have a high speed movement or tracking of the solar collector panel, such as when it is desired to place the reflectorized surface in a stow position. Therefore, bypass valve 44 can be installed by bypass either or both of flow control valves 42 and 43. The purpose of bypass valve 44 is to bypass the flow restriction imposed by the bypass flow control valve. Since the flow control valve does limit fluid flow in one direction, it can be highly desirable to have the capability of high speed injection of hydraulic fluid into the cylinder to allow high speed rotation of the solar panel. Bypass valve 44 can be any suitable device such as a solenoid actuated bypass valve, a manual bypass valve and the like.

When bypass valve 44 is opened, flow control valve 43 will be bypassed and the hydraulic fluid can be injected into the lower portion of cylinder 20 under high speeds. Since flow control valve 42 is normally a flow control valve that controls injection of high pressure fluid into the cylinder and allows free flow of the fluid in the other direction, hydraulic fluid can be rapidly withdrawn from the upper portion of cylinder 20 to thereby allow the piston disposed within the cylinder to move rapidly upward.

The schematic drawing of the hydraulic control system in FIG. 6 has been presented to illustrate the control of hydraulic fluid flow into only one of the hydraulic cylinders. The same type of apparatus can also be utilized to control the hydraulic fluid flow into the other hydraulic cylinder that forms a part of this invention.

In some instances, it may be desirable to use the system illustrated in FIG. 6 to control both the primary and secondary hydraulic cylinders. In such instances, high pressure fluid may be directed through supply conduit 37b to a second three-position, four-way solenoid valve control which will control fluid flow into a second cylinder with the return fluid being returned through return conduit 41a. In other instances, only one four-way solenoid valve may be utilized with the cylinders being connected in parallel with hydraulic fluid lines 32a and 32b being in open communication with lines 31a and 31b as illustrated in FIG. 6.

When such cylinders are operated in parallel, some device, such as a solenoid valve between the two parallel cylinders, should be installed to prevent fluid from being transferred from one cylinder to the other to set up some undesirable oscillation of the solar panel as the fluid transfers from one cylinder to the other.

A core structure is utilized with the solar collector system, as well as for other applications. For the solar collection system, an exterior surface, that is reflective, or has a reflective element coupled there, the exterior surface must be sufficiently smooth to be suitable to provide for the reflection of solar energy. Additionally, the surface of the core structure can be in any variety of different geometric shapes to accommodate a desired geometry of the reflector. In one embodiment, the core structure of the present invention has first and second outer layers that sandwich an interior core.

In one embodiment, the core is a non-honeycomb sandwich structure that can be, (i) a single core of cells, all pointing in the same direction, (ii) a single core of cells that point in two opposing directions, (iii) two or more cores of cells pointing in the same direction (iv) two or more cores of cells with cells pointing in opposing directions and (v) two or more cores of cells with that can be separated by solid or semi-solid sheets that do not include cells and the like. The one or more cores have a mid-plane, with the mid-planes being parallel to each other. The core structure is a sandwich with an open cellular core structure. In one embodiment, the core has multiple directions of corrugation.

In another embodiment, the core is a sandwich structure with a single direction of corrugation.

Figure 7:
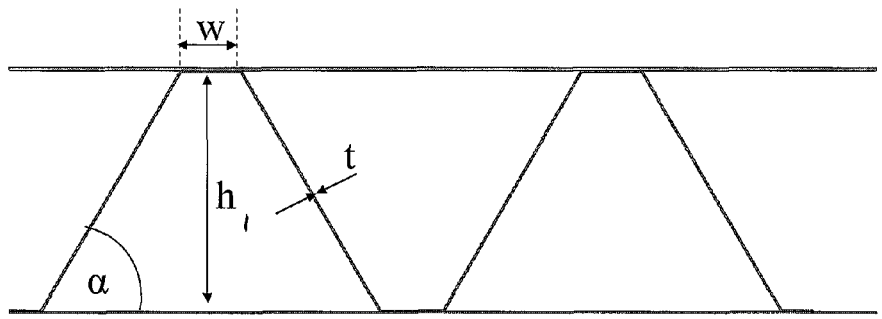
FIGS. 7(a) and 7(b) illustrate a cross-sectional view of an embodiment of a sandwich core structure that is a unidirectional, corrugated core architecture with face sheets.
FIGS. 7(c) through 7(e) show a three dimension view of the FIGS. 7(a) and 7(b) core structure.
Figure 7:
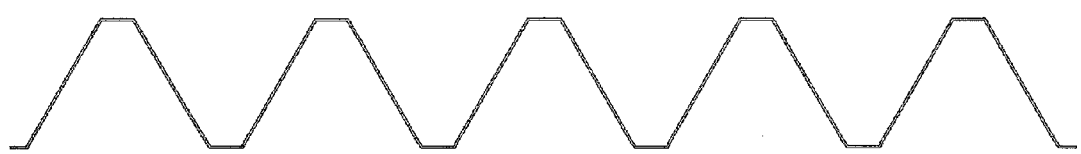
Figure 7C:
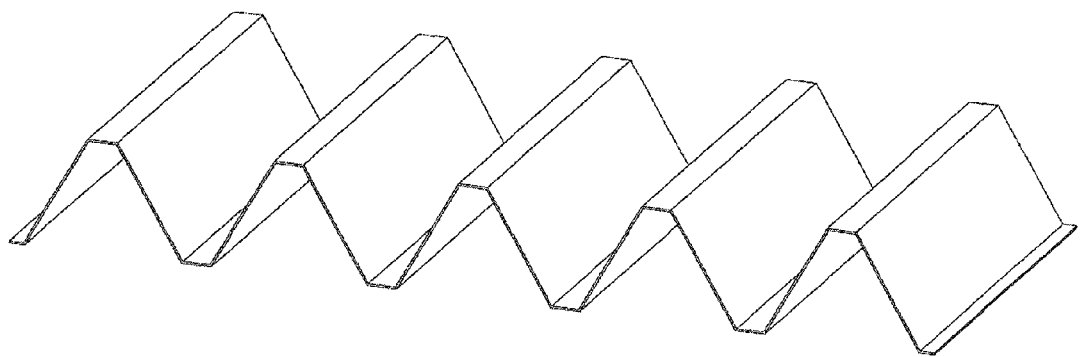
Figure 7D:
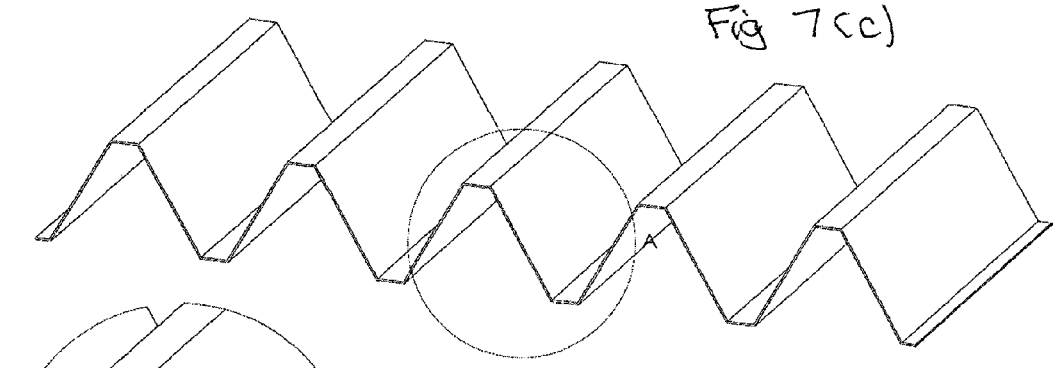
Figure 7E:
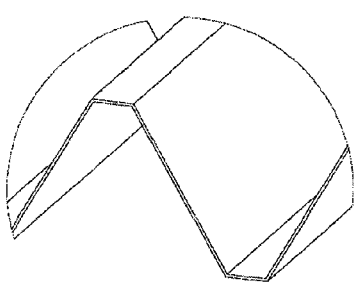

FIGS. 7(a) and 7(b) illustrate a cross-sectional view of an embodiment of a sandwich core structure that is a unidirectional, corrugated core architecture with face sheets. FIGS. 7(c) through 7(e) show a three dimension view of the FIGS. 7(a) and 7(b) core structure.

For the FIG. 7(a) through 7(e) embodiment, the measure of relative density of the entire sandwich core structure is expressed as follows:

$$\rho^* = \frac{\left(w + \frac{h}{\sin\alpha}\right)t}{\left(w + \frac{h}{\tan\alpha}\right)(h+t)}$$

where: $0.01 < \rho^* < 0.2$
and:

$$w \leq \frac{h}{2}$$

T is the thickness of the sandwich core structure, p* is the measure of the relative density and h is a height of the core.

Figure 8A:
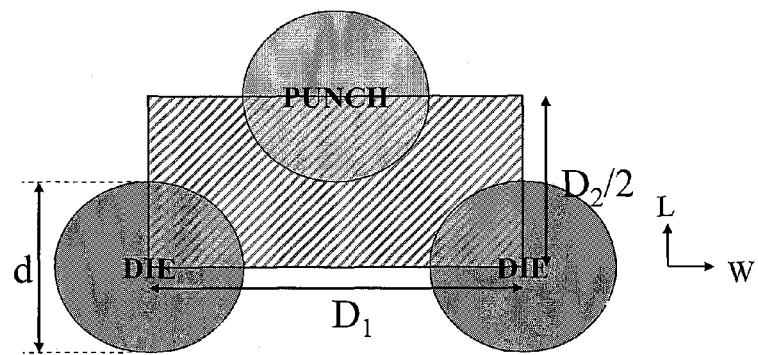
FIG. 8(a) illustrates the spacing of the cells making up the core in embodiments where there are multiple directions of corrugation

FIG. 8(a) illustrates the spacing of the cells making up the core in embodiments where there are multiple directions of corrugation. D1 is the distance between centers of cells in one core layer, and D2 is the distance between cells in adjacent core layers. H is the height of a core layer. T is the thickness of the sandwich core material.

The relationship of D2 to D1 and h to t is for embodiments with multiple directions of corrugation is as follows.

Figure 8B:
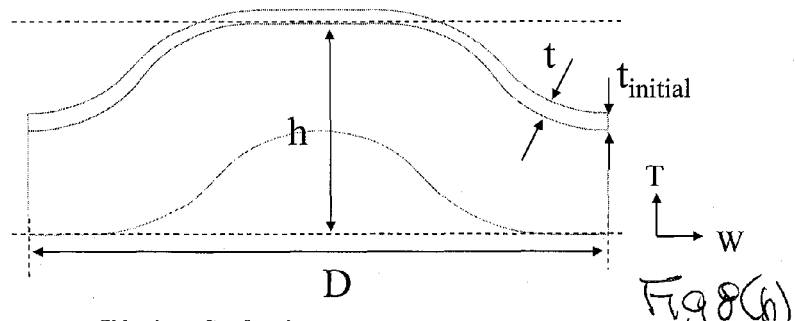
FIG. 8(b) shows the height and t in a multiple direction of corrugation sandwich core structure of the present invention.

$2 \geq D_2/D_1 \geq 1$ $2/3 > h/D > 1/3$ where $D = \min(D_1, D_2)$ $0.01 < t/(h+t) < 0.2$ FIG. 8(b) shows the height and t in a multiple direction of corrugation sandwich core structure of the present invention.

Figure 8C:
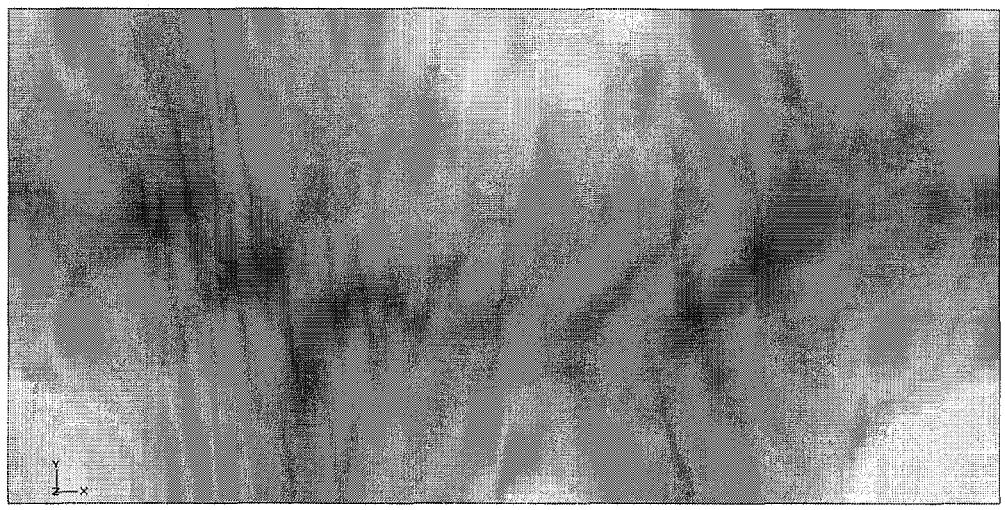
FIG. 8(c) is a top view of the FIG. 8(a) embodiment.
Figure 8D:
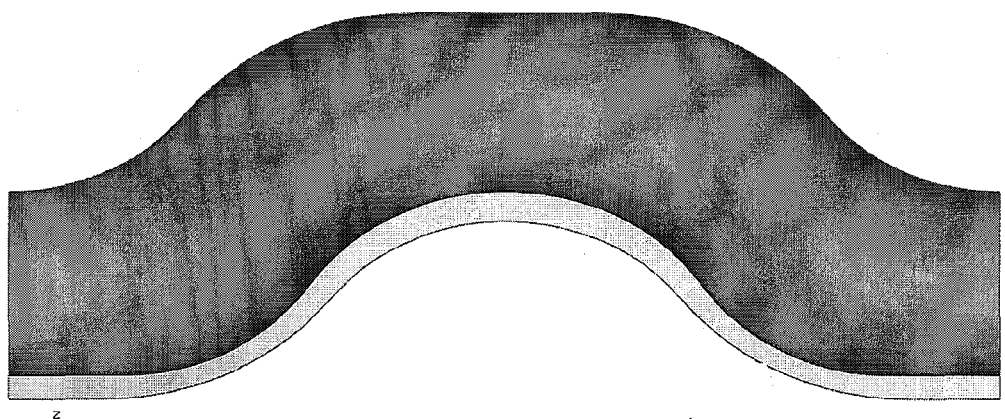
FIG. 8(d) is a side view and FIG. 8(e) is a three-dimensional view.
Figure 8E:
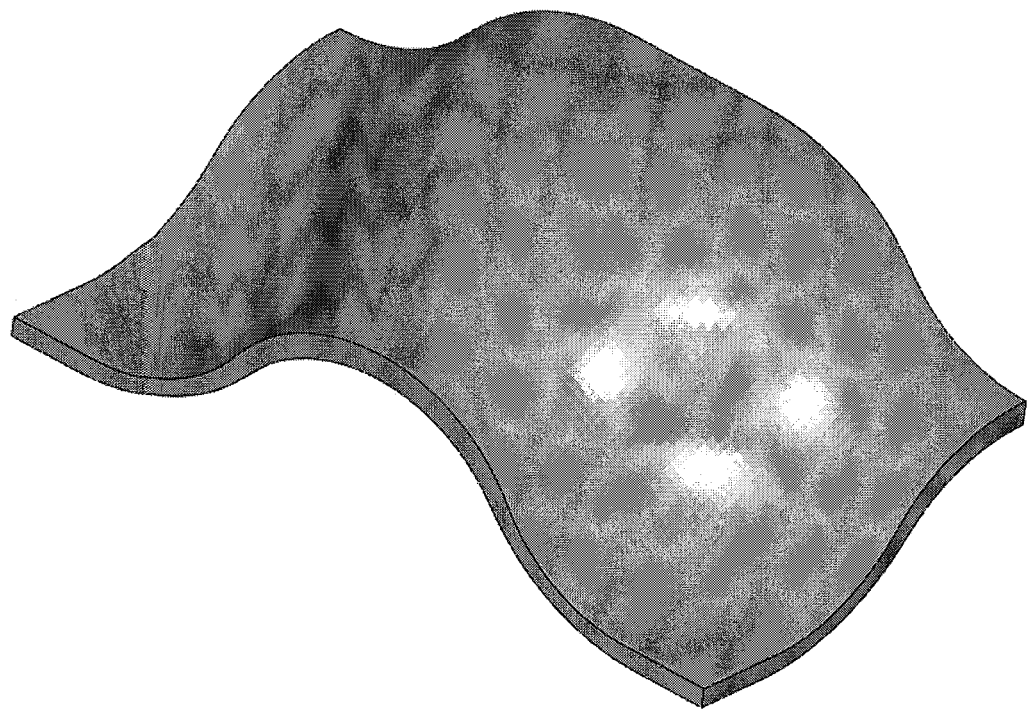

FIG. 8(c) is atop view of the FIG. 8(a) embodiment. FIG. 8(d) is a side view and FIG. 8(e) is a three-dimensional view.

Figure 9:
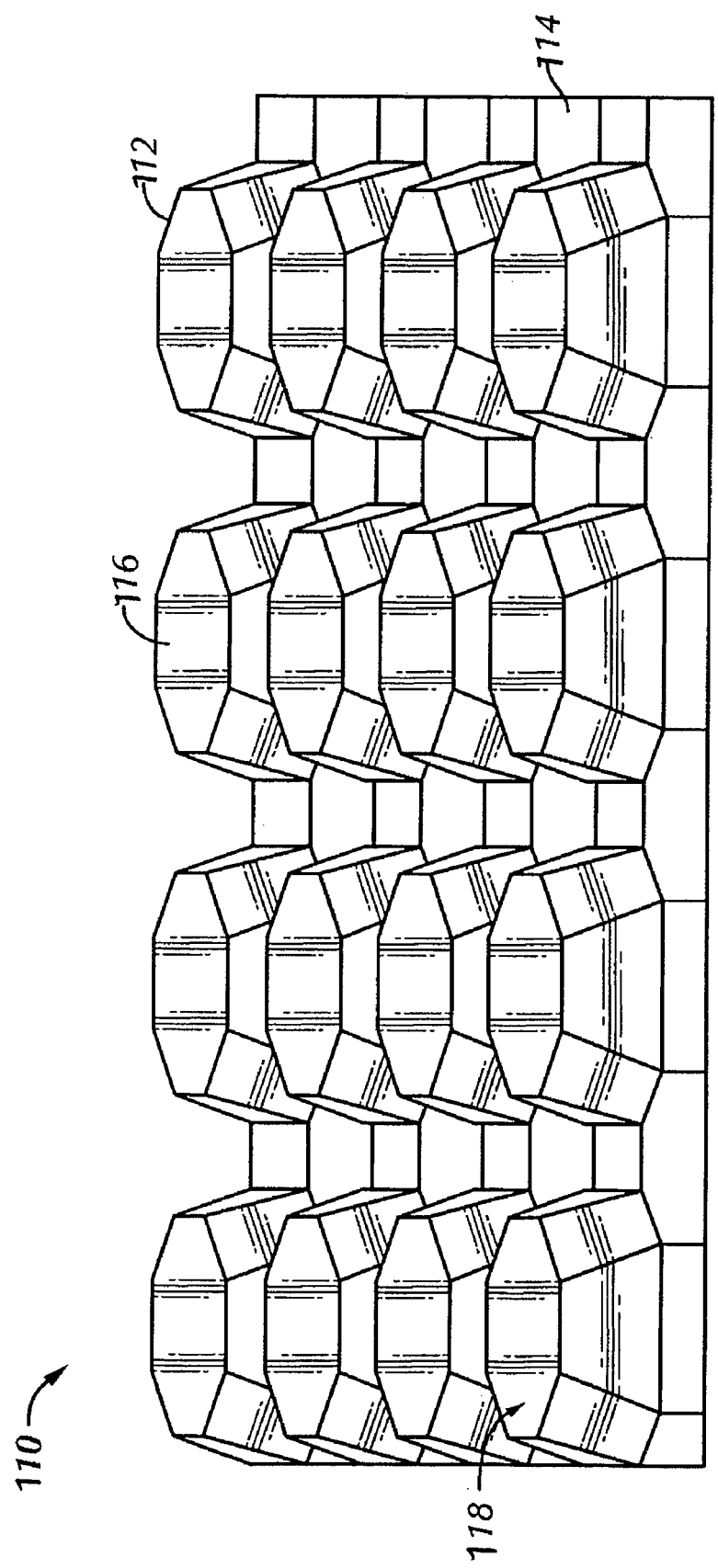
FIG. 9 is a perspective view of a formed metal core sheet according to one embodiment of the invention.

FIG. 9 illustrates a perspective view of one embodiment of a core structure of the present invention. In one embodiment, illustrated in FIG. 9, a formed metal core 110 is formed in a corrugated pattern having a plurality of cells 112 comprising alternating front and rear projections extending outwardly in front of and behind a median plane 114, with each projection having a bonding surface area or land 116 configured to be brazed or bonded with corresponding external metal sheets (not shown) on both sides of the median plane 114. A plurality of micro-abrasions or indentations 118 are optionally formed on the bonding lands 116. As explained in further detail below, the micro-abrasions 118 provide stronger brazing joints to be formed between the metal core 110 and the external metal sheets by facilitating improved capillary action by the metal core 110 during the brazing process.

Figure 10A:
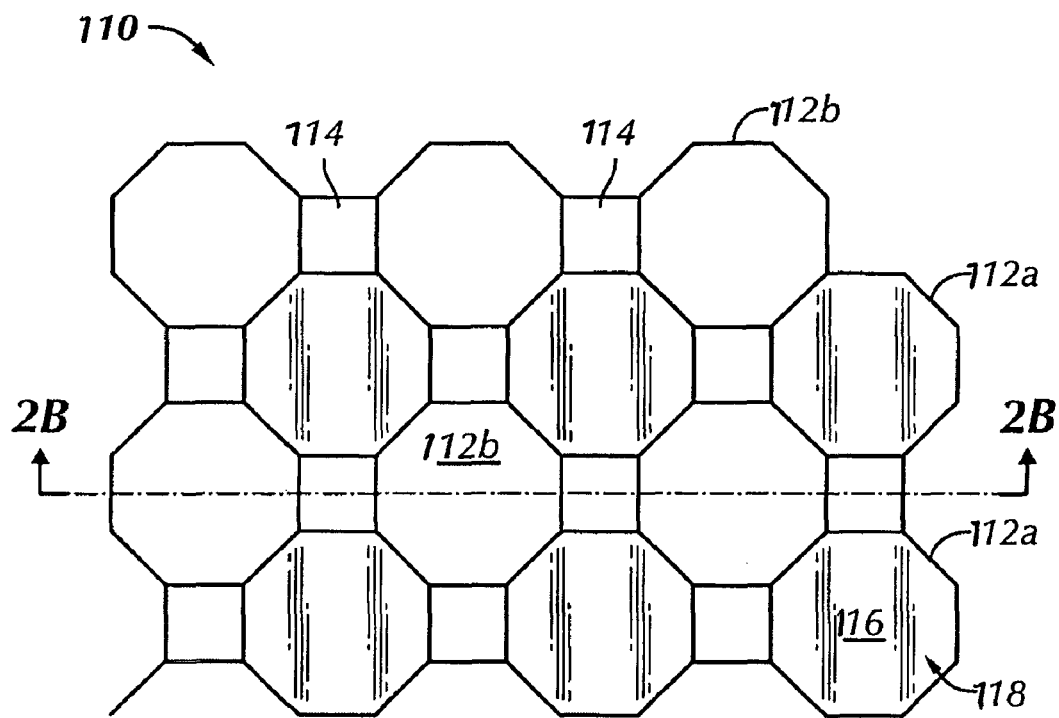
FIG. 10A is a top view of the formed metal core sheet that is depicted in FIG. 9.

FIG. 10(a) illustrates a top view of the formed metal core 110 of FIG. 9. The metal core 110 includes a plurality of upwardly projecting cells 112A and a plurality of downwardly projecting cells 112B. The bonding lands 116 of the upwardly projecting cells 112A are also shown while the bonding lands 116 of the downwardly projecting cells 112B are located on the opposite side of the core 110 and, hence, not shown in FIG. 10(a). A plurality of micro abrasions or indentions 118 are optionally formed on the bonding lands 116 of each cell 112A and 112B to facilitate improved capillary action of the metal core 110 during brazing.

Figure 10B:
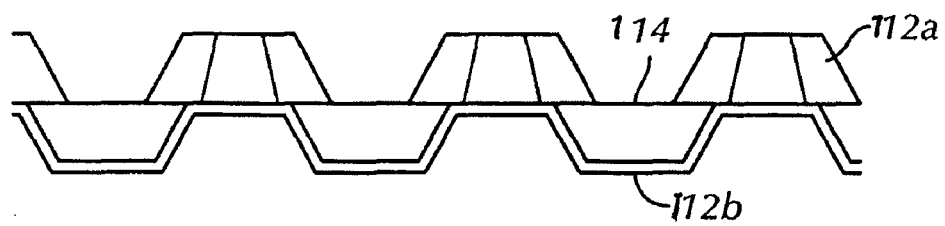
FIG. 10B is a cross-sectional view of the formed metal sheet of FIGS. 9 and 10A as taken along lines 2B-2B of FIG. 10A.

FIG. 10(b) illustrates a cross-sectional side view of the metal core 110 taken along perspective lines 2(b)-2(b) of FIG. 10(a). As shown in FIGS. 9, 8(a) and 8(b), in one embodiment, each cell 118(a) and 112B is formed in the shape of an octagon. However, it is understood that the invention is not limited to any particular shape, size and/or configuration of the cells 118(a), 112B. Any desired shape, size and configuration of cells may be utilized to achieve various desired physical characteristics of the resulting metal core sandwich structure, in accordance with the present invention.

Figure 11A:
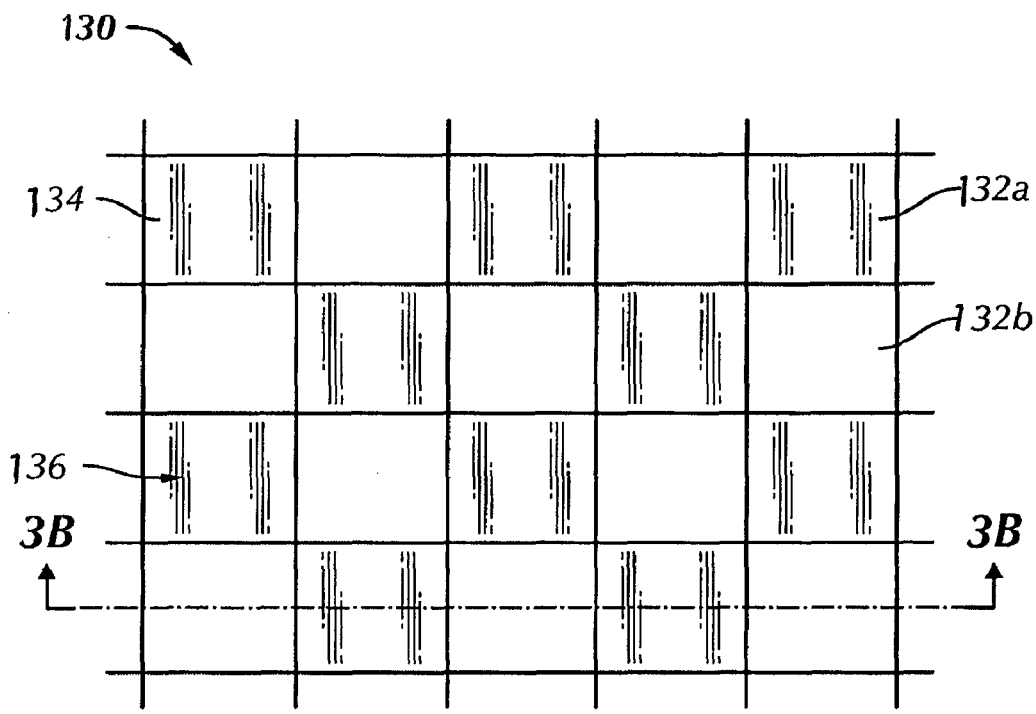
FIG. 11A is a top view of a metal core sheet formed in a corrugated checker-board pattern according to one embodiment of the invention.
Figure 11B:
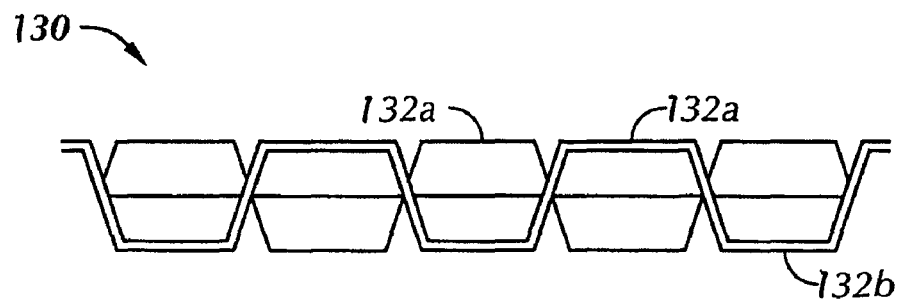
FIG. 11B is a cross-sectional view of the formed metal core of FIG. 11A as taken along lines 3B-3B of FIG. 11A.

FIG. 11(a) illustrates atop view of an alternative, exemplary formed metal core 130 having a plurality of square-shaped cells 132A and 1328 in a checkerboard configuration. The cells 132A represent upwardly projecting cells and the cells 132B represent downwardly projecting cells. Each cell 132A and 132B has a corresponding bonding land 134 and a plurality of micro-abrasions 136 on the surface of each bonding land 134. FIG. 11(b) illustrates a cross-sectional side view of the formed metal core 130 of FIG. 11(a), taken along lines 3(b)-3(b) of that figure.

Figure 12:
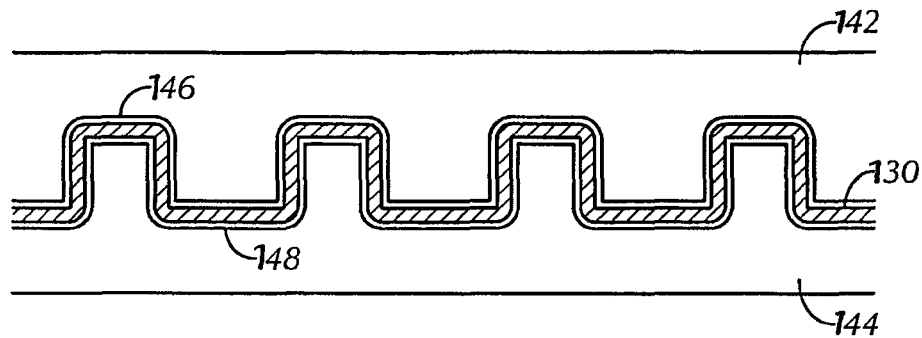
FIG. 12 is a side view of a metal core sheet formed between two press plates or molds according to one embodiment of the invention.

FIG. 12 illustrates a cross-sectional side view of the metal core 130 as it is formed between two presses 142 and 144 having corresponding molded patterns and configurations to form the metal core 130 into a desired shape and configuration. During forming, a flat sheet of metal material 130 is placed between the top and bottom presses 142 and 144, respectively. As the top and bottom presses 142 and 144 are pressed together the metal core 130 is formed via stretching and/or gathering of the metal sheet material 130 to form the cells 132A and 132B in a checkerboard configuration. It is understood that the presses 142 and 144 are exemplary only and that presses having other desired molded patterns and configurations may be utilized to form a metal core having cells of various shapes (e.g., octagons, hexagons, pentagons, squares, triangles, etc.), and sizes, and configurations.

In one embodiment, the optional micro-abrasions 136 illustrated in FIG. 11(a), for example, are formed during pressing of the metal core 130. A plurality of micro-protrusions, ridges and/or lines (collectively referred to herein as "micro-protrusions") (not shown) are provided on selected surfaces 146 and 418 of top and bottom presses 142 and 144, respectively. During pressing of the metal core 130, the micro-protrusions form the plurality of micro-abrasions 136 on the bonding lands 134 of the cells 132A, 132B of the formed metal core 130. In one embodiment, the micro-protrusions are formed on the surfaces of the presses 412 and 144 corresponding to the bonding lands 134 of the formed metal core 130. In one embodiment, the micro-protrusions are formed on the corresponding press surfaces by fine etching of press surfaces using known device and techniques (e.g., electrical metal etching, chemical etching, sand blasting, grit blasting, etc.). In one embodiment, the micro-protrusions are formed so as to provide micro-abrasions 136 having a depth and/or width of 0.0005 inches to 0.002 inches and cover approximately 50-80% of the surface area of the bonding lands 134. In various embodiments, the abrasions 136 may be substantially parallel channels, criss-cross configurations, or channels traveling in random directions and/or curved channels. In alternative embodiments, the micro-abrasions may be formed by electronic discharge machining (EDM) processes, which are well-known in the art. In other embodiments, the micro-abrasions 136 may be formed on the bonding lands 134 of the metal core 130 after the metal core 130 has been pressed and formed. It is appreciated, however, that providing presses 142 and 144 with preformed micro-protrusions that automatically form micro-abrasions 136 on the metal core 130 during pressing can save substantial time and work when compared to forming the micro-abrasions 136 manually or individually for each metal core 130 subsequent to pressing.

In alternative embodiments, the metal core 110, 130 may be formed after a brazing material has been placed on each side of the core 110, 130. Thus, the metal core sheet, plus brazing material on each side of the metal core sheets, are pressed and formed together by the presses 142 and 144. The brazing material can be placed onto the surface of the metal core 110, 130 prior to forming the core 110, 130 by spraying a brazing powder onto the core sheet to be formed or by placing sheets of brazing material 150 on either side of the core sheet to be formed. With the proper amount of pressure during forming, the brazing material will be embedded into the core sheet. This facilitates the subsequent brazing process by evenly distributing the braze material across the surface of the core sheet to be formed. In these embodiments, the micro-abrasions 118, 136 are formed and pass through the brazing material onto the bonding lands 116, 134 of the formed metal core 110, 130. Thereafter, the formed metal core 110, 130 plus formed brazing material sheets are sandwiched between two external metal sheets and brazed at high temperature (e.g., 670 to 730 degrees Celsius) in a reduced-atmosphere or vacuum furnace to produce a metal core sandwich structure in accordance with the present invention.

Figure 13:
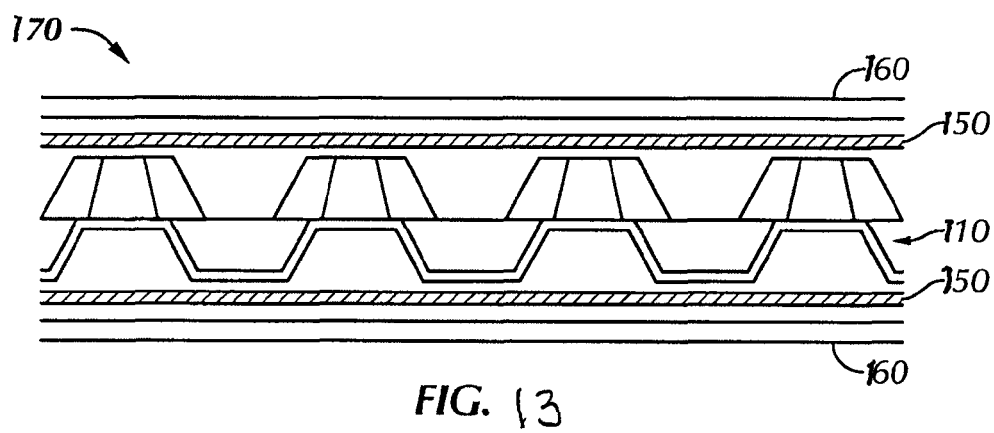
FIG. 13 is an exploded side view of a metal core sandwich structure prior to brazing according to one embodiment of the invention.

FIG. 13 illustrates an exploded cross-sectional side view of an exemplary formed metal core 10 (FIG. 9) sandwiched between two sheets of brazing material 150, which are in turn sandwiched between two external metal sheets 160. In this embodiment, the brazing material sheets 150 have not been pressed and formed with the metal core 110, as described above.

Figure 14:
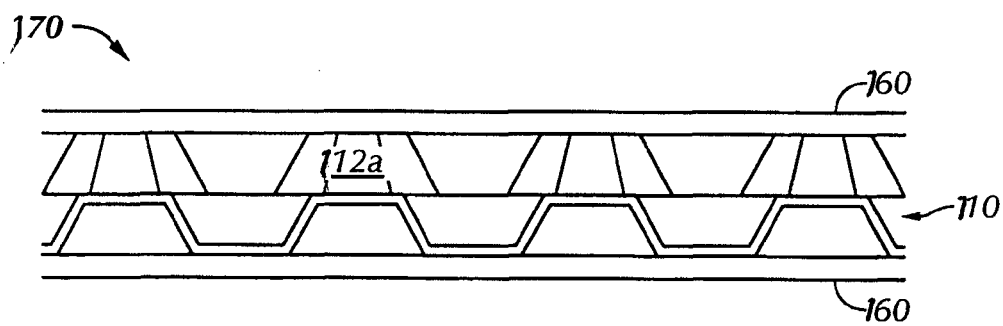
FIG. 14 is an exploded side view of the metal core sandwich structure of FIG. 12 after brazing.

FIG. 14 illustrates a cross-section side view of the resulting metal core sandwich structure 170 after brazing of the metal core 110 to the external metal sheets 160 has been completed. The micro-abrasions 118 (FIG. 10A) allow for an improved capillary effect so that the brazing material 50, upon melting, flows into the pores of the bonding lands 116 (FIGS. 9 and 10A) more easily and thereby provides a stronger braze joint between the closely fitted surfaces of the bonding lands 116 and the external metal sheets 160. The improved capillary effect and, hence, improved brazing joint provided by the micro-abrasions 118 produce a stronger metal core sandwich structure 170 that can be formed into compound curves, and other shapes and forms, more easily without delaminating, wrinkling or otherwise losing its structural integrity. In further embodiments, micro-abrasions may also be formed on the interior surface of the external metal sheets 160 in order to improve the capillary effect of the external metal sheets 160 during brazing.

Optionally, prior to brazing, all of the layers of the metal sandwich structure 170, comprising a formed metal core 110, brazing material sheets 150 and two outer metal sheets 160, are fully or partially electro-tack-welded together so as to secure the multiple layers to one another and prevent relative movements during the brazing process. This further improves the strength of the braze joints formed between the bonding lands 116 of the core 110 and the external metal sheets 160 to provide a higher quality finished product.

Figure 15:
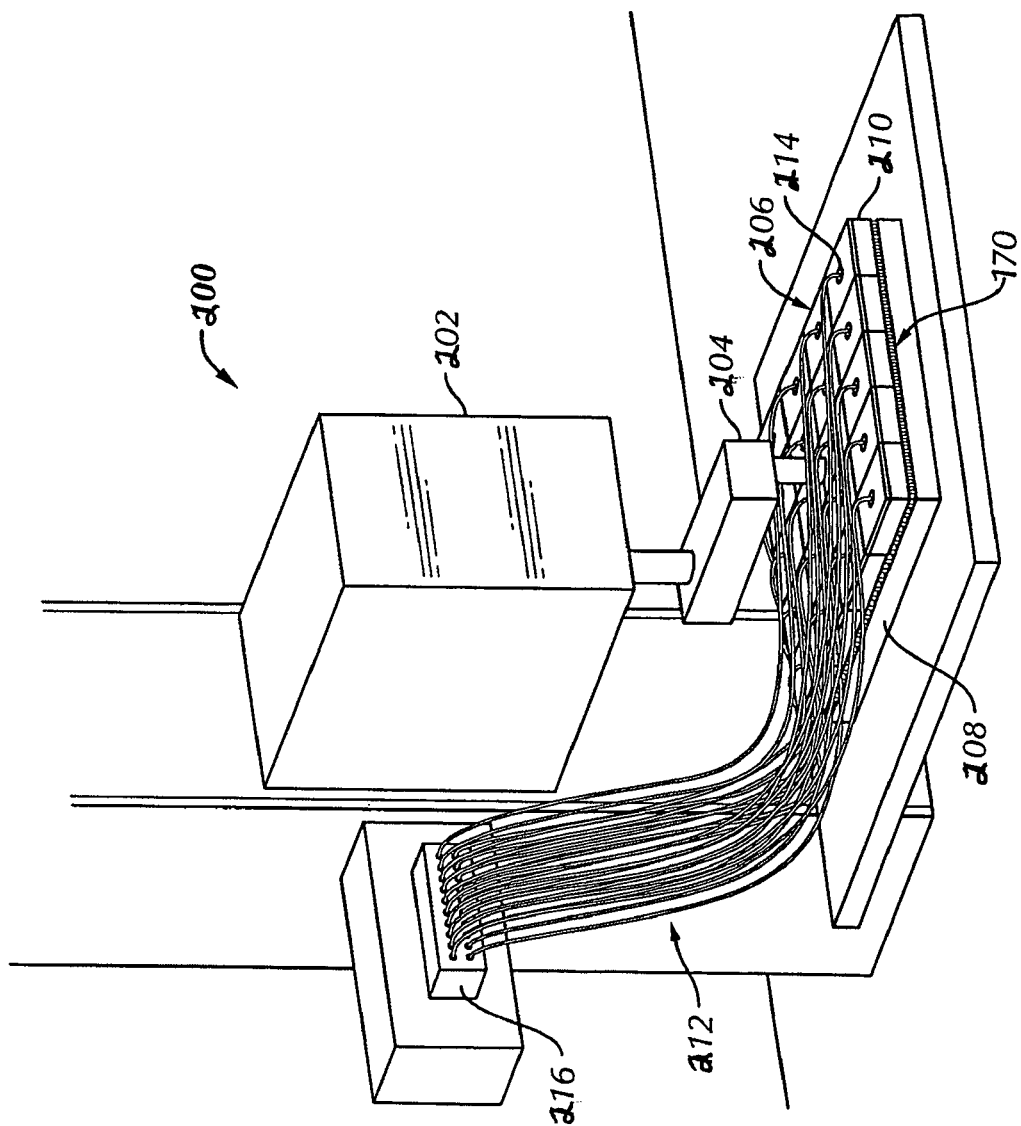
FIG. 15 is a perspective view of an electro-tack welding apparatus that is useful with various embodiments of the present invention.

FIG. 15 illustrates a perspective view of a tack welding apparatus 200 that may be used in conjunction with the present invention. The apparatus 200 includes a computer and/or electronically controlled actuator box 202 that contains standard electronics and mechanical components (e.g., gears, switches, power supply, etc.) to control movement of an actuator arm 204 that controls movement of a top plate 206. The metal core sandwich structure 170 (FIGS. 9 and 14) is positioned between the top plate 206 and a bottom ground plate 208. As shown in 15, the top tack-welding plate 206 comprises a plurality of subsections 210 that are electrically insulated from each other. In one embodiment, the subsections 210 can be made from copper or copper-alloy and are insulated from one another by an insulating material (e.g., ceramic). Each of the subsections 210 are electrically coupled to a corresponding conductive wire 212 via corresponding contacts 214. The conductive wires 212 are coupled to a power switch box 216 that controls when electrical current is supplied to each individual wire 212. The power switch box 216 can be controlled by a computer or processor (not shown).

In one embodiment, a high energy, low voltage current is sequentially applied to each subsection 210 to tack-weld a corresponding portion of the metal core sandwich structure 170 located between the corresponding subsection 210 and the bottom ground plate 208. In one embodiment, the top and bottom plates 206 and 208, respectively, apply an even pressure throughout the sandwich structure 170. A sequence of tack welds are rapidly performed in different areas of the sandwich structure 170 by sequentially applying an electrical current to each subsection 210 of the top plate 206. By sequentially tack-welding only portions of the sandwich structure 170 at any one time, this tack-welding process allows for controlled heating and cooling throughout the sandwich structure 170, which in turn allows for improved tack welds. Thus, portions of the sandwich structure 170 following tack-welding are allowed to cool while other portions are being tack-welded. This cooling process provides better tack-welds and the resulting sandwich structure 170 has a lower tendency to delaminate at individual tack welds. In other words, letting the structure 170 heat up and cool in different areas as it is being tack welded helps prevent individual tack welds from separating. After the metal core sandwich structure 170 has been tack welded together, as described above, the structure 170 is then placed in a furnace for brazing.

The metal core sandwich structure 170 may incorporate any type of metal and/or metal alloys as the formed core 110, 130 and the external metal sheets 160, such as A1 or D2 steel, for example. It is understood that any metals, metal alloys, or combinations thereof, that are suitable for brazing are contemplated to be within the scope of the present invention (e.g., copper, aluminum, titanium, etc.). Additionally, any type of known brazing material in the form of sheets, foils, sprays, powders, paste or slurries, for example, may be utilized in accordance with the present invention. Furthermore, it is contemplated that some embodiments of the invention may utilize non-metal core materials and non-metal external sheets. For example, known synthetic and/or polymer materials (e.g., Kevlar) may be used to form an injection-molded core and thereafter bonded (e.g., sonically welded and/or vibration welded) to synthetic and/or polymer outer sheets. Micro-abrasions are formed on the bonding lands of the non-metal core which facilitate gripping between the core and the external sheets during and after welding.

Further embodiments of metal core sandwich structures may include using a double cell sandwich core. These embodiments also have two external sheets defining a central core; but, instead of using a single core sheet (such as sheet 10 of 12), exemplary embodiments of double cell sandwich structures may use two core sheets.

Figure 16:
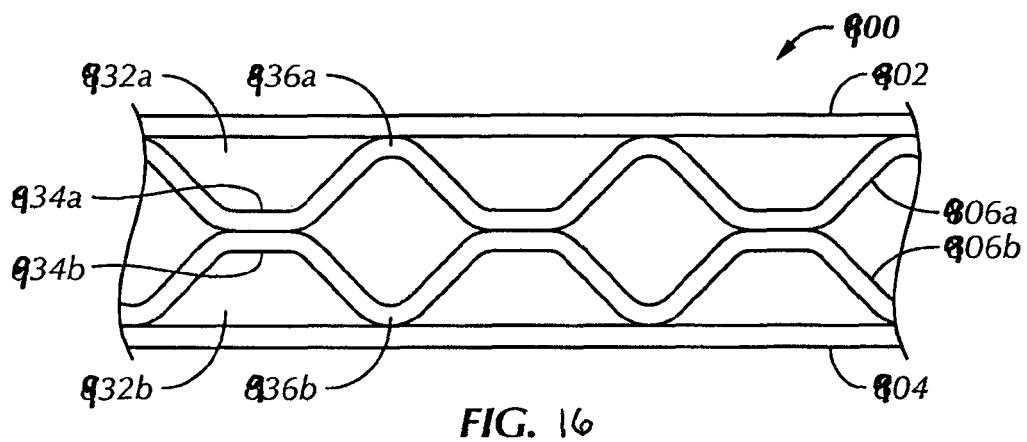
FIG. 16 is a cross-sectional view of a double cell sandwich structure according to one embodiment of the present invention.

One embodiment of a double cell sandwich structure 900 is shown in FIG. 16. Double cell sandwich structure 900 can comprise external sheets 902 and 904 sandwiching a first core sheet 906a and a second core sheet 906b. External sheets 902 and 904 may be the same as sheets 60 shown in 12. First core sheet 906a and second core sheet 906b may be made of the same materials as detailed above with reference to core sheet 110. In the embodiment 900, the first core sheet 906a and the second core sheet 906b comprise a plurality of pyramid-shaped cells 932a, 932b.

Further to 16, inwardly projecting lands 934a of the first sheet 906a contact corresponding inwardly projecting lands 934b of the second sheet 906b. In addition, outwardly extending lands 936a of the first sheet 906a contact an interior side of the external sheet 902 and outwardly extending lands 936b of the second sheet 906b contact an interior side the external sheet 904. The inwardly projecting landings 934a of the first sheet can be configured to be brazed or bonded with corresponding inwardly facing landings 934b of the second sheet. Moreover, outwardly facing landings 936a and 936b of the first sheet and the second sheet, respectively, can be configured to be brazed or bonded with the interior surface of corresponding external metal sheets 902 and 904. It is understood that any brazing or bonding technique described above may be similarly used with the lands 934 and 936 and external sheets 902 and 904 to facilitate gripping between the core sheets and the core sheets and external sheets. In one embodiment, micro-abrasions 118 are formed on a plurality of lands 934 and/or 936 to improve capillary action during the brazing process.

Figure 17:
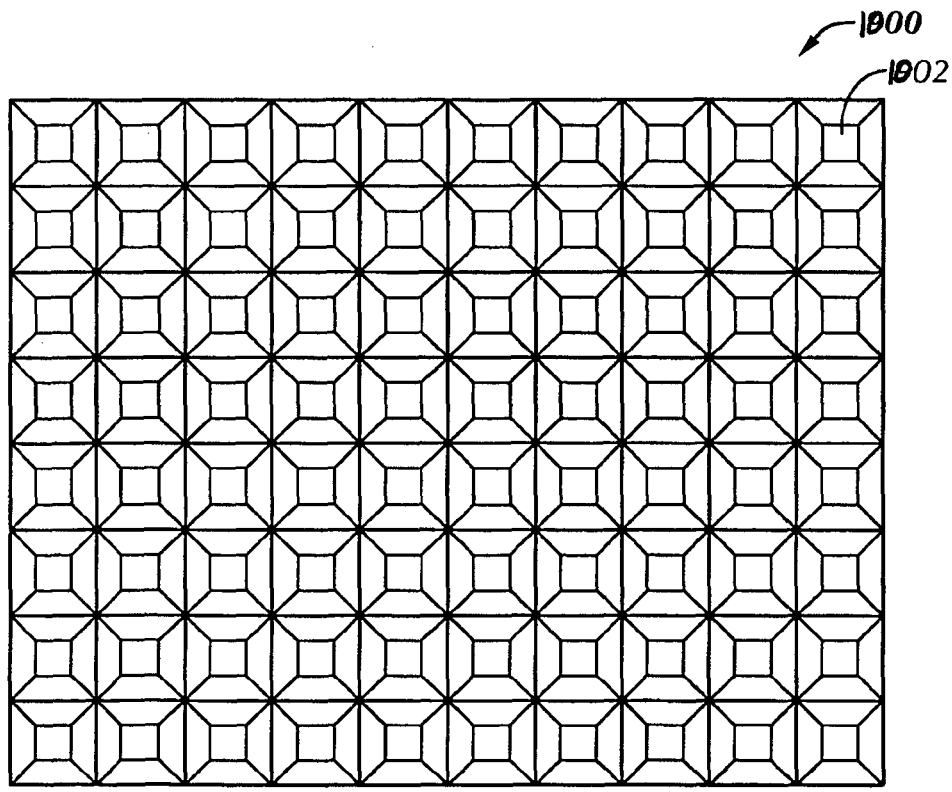
FIG. 17 is a top view of a press plate used in the embodiment depicted by FIG. 16.

FIG. 17 illustrates a top view of a press 1000 configured to press or mold core sheets 906a and 906b, in accordance with one embodiment of the present invention. Press 1000 has corresponding molded patterns, such as punch 1002, and configurations to form the cores sheets 906a and 906b. During forming, a flat sheet of metal material can be placed between the top press 1000 and a corresponding bottom press (not shown). As the top press 1000 and the bottom press are pressed together, a core sheet is formed via stretching and/or gathering of the metal sheet. It is understood that press 1000 is exemplary only and that presses having other desired molded patterns and configurations may be used to form metal core sheets having cells of various shapes, sizes and configurations.

Figure 18:
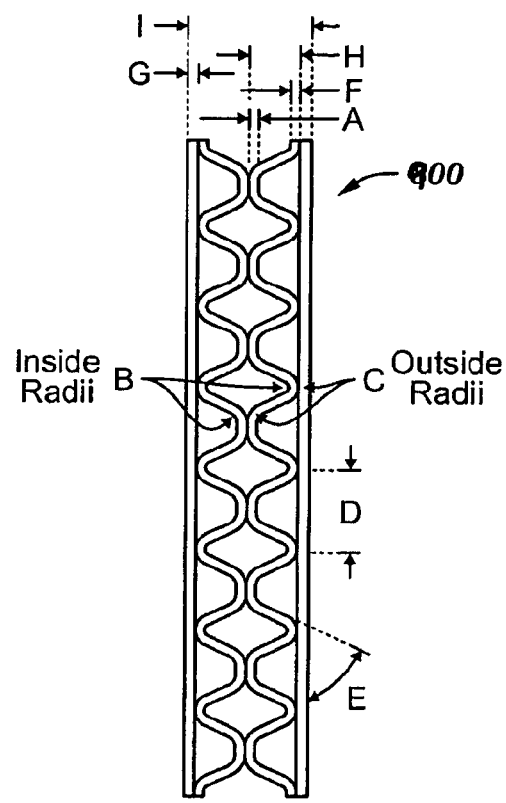
FIG. 18 is a cross-sectional view of the embodiment depicted by FIG. 16 showing exemplary dimensions.

FIG. 18 is a cross-sectional view of structure 900 showing exemplary dimensions of the structure 900. The exemplary dimensions are as follows: an inwardly projecting landing thickness of at least, A=0.0040"; an inside radii B=0.0006"; an outside radii C=0.010"; a cell diameter D=0.050"; a cell incline E=70.degree.; an outwardly projecting landing thickness F=0.0040"; an external sheet thickness G=0.0060"; a core sheets width H=0.0300"; and a sandwich cell structure width I=0.0720". It is understood that the above dimensions are exemplary only and that a sandwich core structure having other sizes and configurations may be used as desired to fit the needs of a particular application.

Figure 19:
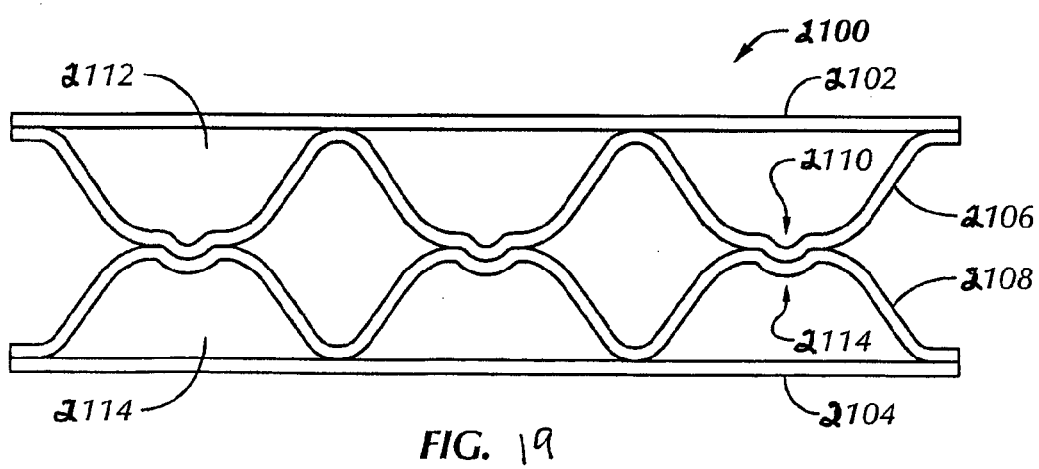
FIG. 19 is a cross-sectional view of a double cell sandwich structure according to another embodiment of the present invention.

FIG. 19 is a cross-sectional side view of a further embodiment of a double cell sandwich structure 2100. Structure 2100 has external sheets 2102 and 2104 sandwiching first core sheet 2006 and second core sheet 2108. The first core sheet 2006 has a generally sinusoidal cross-sectional shape with an optional bulge 2110 located at a tip of each inwardly projecting peak 2112. The second core sheet 2108 also has a generally sinusoidal cross-sectional shape, but has an optional dimple 2114 located at a tip of each inwardly projecting peak 2116. As seen in FIG. 19, the bulges 2110 sit in the corresponding dimples 2114.

The optional bulges 2110 and dimples 2114, as well as area near the bulges and dimples, may be brazed or bonded to facilitate gripping with a corresponding surface. Moreover, outwardly facing landings 2118a and 2118b of the first sheet 2106 and the second sheet 2108, respectively, can be configured to be brazed or bonded with the interior surface of corresponding external metal sheets 2104 and 2102. As is appreciated, any suitable brazing or bonding technique described in this disclosure may be used. In one embodiment, micro-abrasions 118 are formed on respective surfaces to improve capillary action during the brazing process.

Similar to embodiments described above, the first core sheet 2106 and the second core sheet 2108 may be formed between two presses having corresponding molded patterns and configurations to form a flat metal sheet into the desired shape and configuration.

Figure 20A:
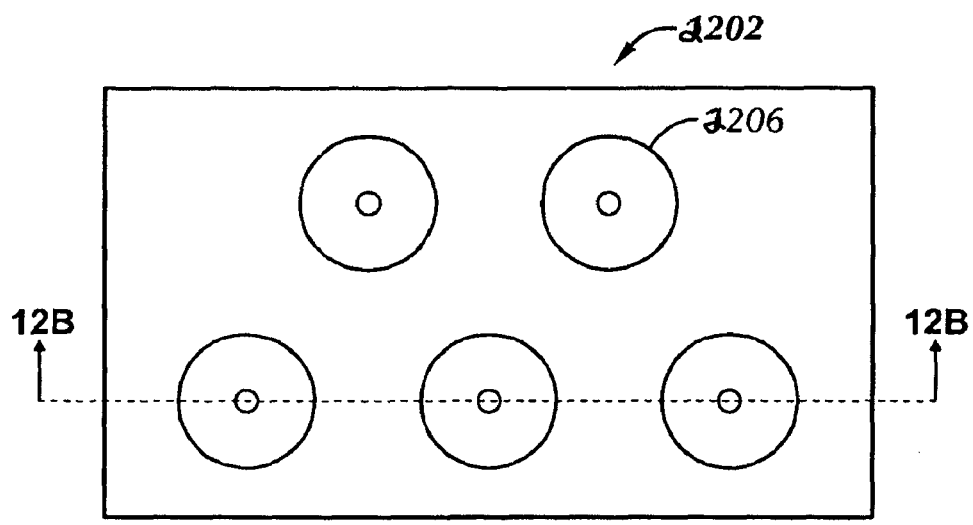
FIG. 20a is a top view of an upper press used to form a first core sheet used in the embodiment illustrated by FIG. 19.

FIG. 20(a) is a top view of an upper press 2202 having a plurality of pins 2206 for forming the first core sheet 2006. In one embodiment, pins 2206 are spaced an equal distance away from each adjacent pin 2206. In a further embodiment, partial pins that would otherwise be located at edges of the press 2202 are eliminated. This is believed to help avoid sharp edges which could cut the material being formed. Only five pins 2206 are shown in 20(a) for ease of understanding for the reader. As is appreciated, there is no limit as to the number of pins 2206 that can be used.

Figure 20B:
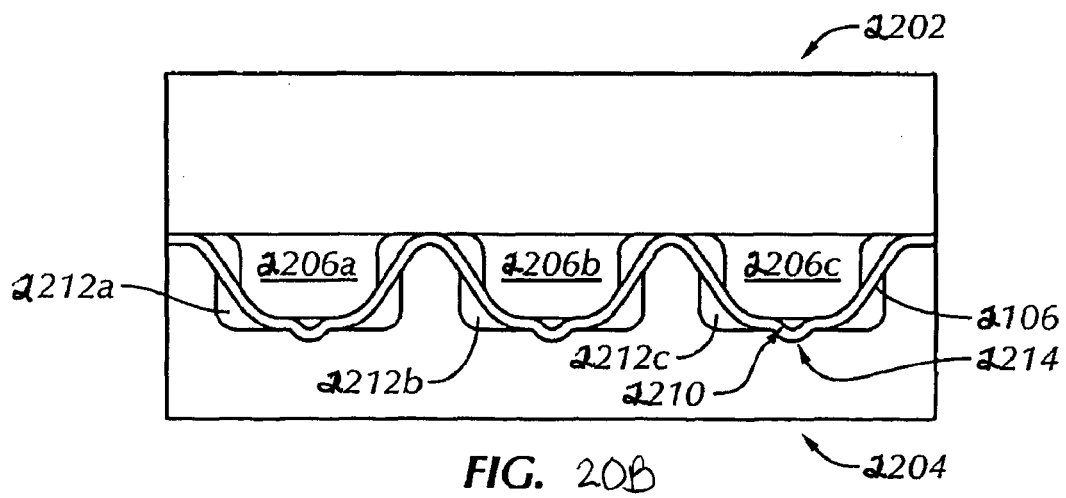
FIG. 20b is a cross-sectional view of the upper press depicted in FIG. 20 and a lower press that is used to form a first core sheet according to one embodiment of the present invention.

FIG. 20(b) illustrates the cross-sectional side view of the upper press 2202, taken along the lines 12-12 of FIG. 20(a), and lower press 2204 forming the first core sheet 2106 in accordance with one embodiment of the present invention. As can be seen, pins 2206a, 2206b, 2206c have a generally conical shape and extend outwardly from a baseline 2208 of the upper press 2202. Located at a tip of each pin 2206a, 2206b, 2206c is a projection 2210. The lower press 2204 has a plurality of conically-shaped cavities 2212a, 2212b, 2212c, each cavity 2212 having an indentation 2214 located at a central bottom area of each cavity 2212. Pins 2206a, 2206b, 2206c extends into respective cavities 2212a, 2212b, 2212c when the upper press 2202 and lower press 2204 are pressed together to form the first core sheet 2106.

Figure 21A:
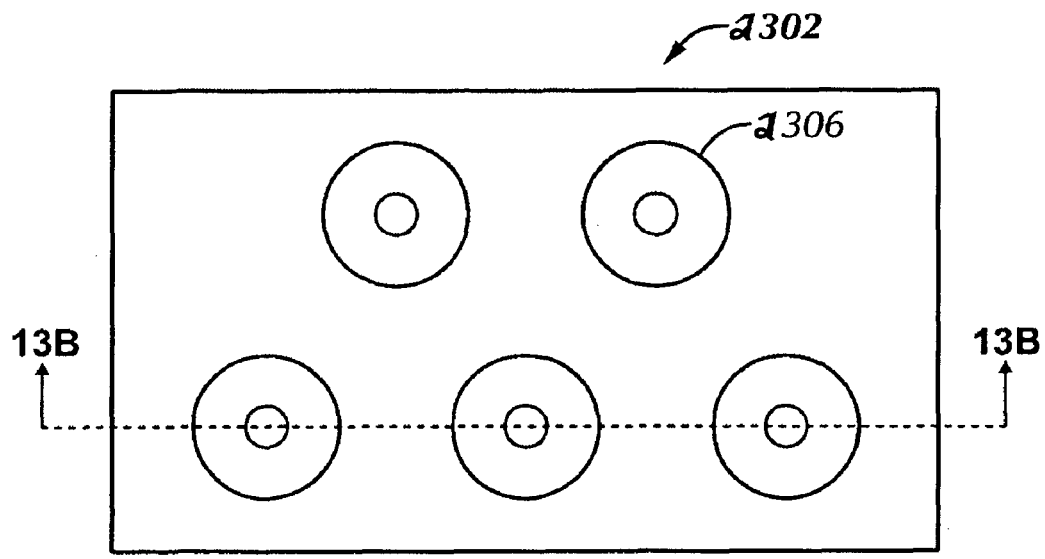
FIG. 21a is a top view of an upper press used to form a second core sheet as used in the embodiment illustrated by FIG. 19.

FIG. 21a is a top view of an upper press 2302 having a plurality of pins 2306 for forming the second core sheet 2108. As with the upper press 2202, pins 2306 may be spaced an equal distance away from each adjacent pin 2306 and partial pins that would otherwise be located at edges of the press may be eliminated. Eliminating partial pins on the edges of a press is believed to help avoid sharp edges which could cut the material being formed. Also, only five pins 2306 are shown in FIG. 21 for ease of understanding for the reader. As is appreciated, however, there is no limit as to the number of pins 2306 that can be used.

Figure 21B:
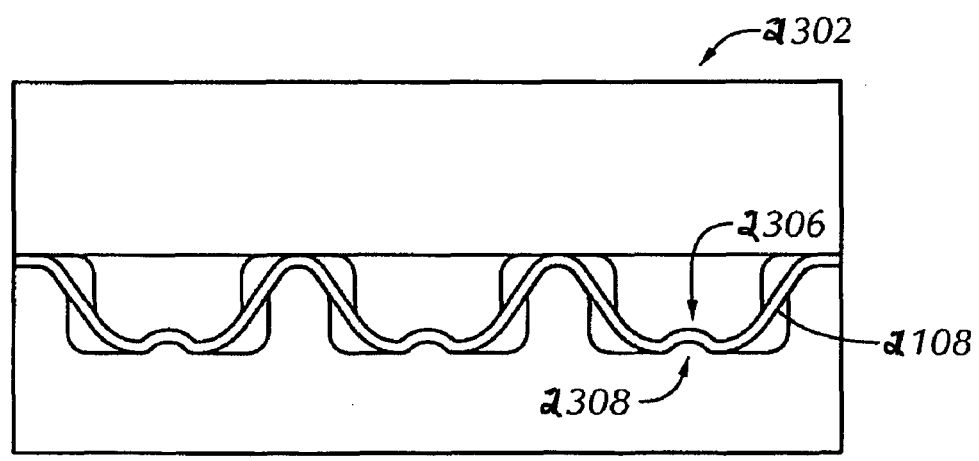
FIG. 21b is a cross-sectional view of the upper press depicted in FIG. 21a as taken along the lines 12b-12b of that figure and a lower press for forming a second core sheet according to one embodiment of the present invention.

FIG. 21b illustrates a cross-sectional side view of upper press 2302, taken along the lines 13b-13b of FIG. 21a, and lower press 2304 forming a second core sheet 2108 in accordance with an embodiment of the present invention. The upper press 2302 and lower press 2304 can be similar to the upper press 2202 and lower press 2204, respectively, with an exception being that the upper press 2302 has indentations 2306 instead of projections 2210 and the lower press 2304 has projections 2308 instead of indentations 2214. In other words, the placement on respective presses of the projections and indentations for forming the first core sheet 2106 is reversed for forming the second core sheet 2108. Also, the indentations 2306 and projections 2308 are preferably larger than the indentations 2214 and projections 2210 to permit the bulges 2110 formed in the first sheet 2106 to sit in the dimples 2114 formed in the second sheet 2108, as shown in 17.

Figure 22:
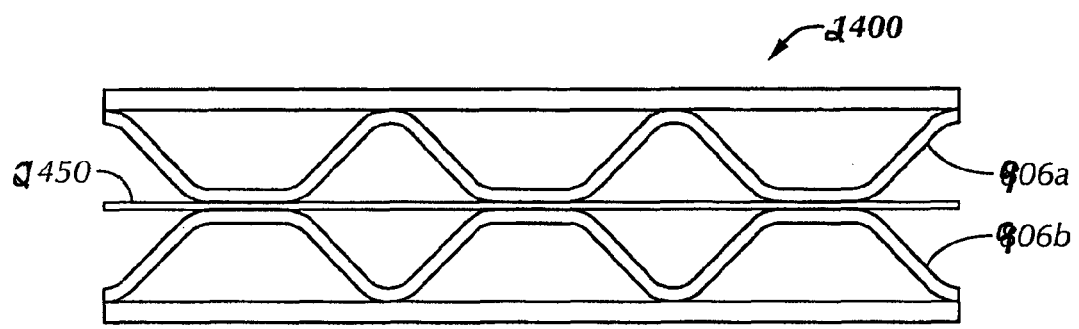
FIG. 22 is a cross-sectional view of a double cell sandwich structure comprising a middle sheet according to one embodiment of the present invention.

FIG. 22 illustrates a cross-sectional side view of a double cell sandwich structure 2400 having a middle sheet in accordance with another embodiment of the present invention. Some parts of the structure 2400 are identical to those of the previously described embodiments, and like reference numerals have been used for like parts as appropriate. As shown in FIG. 22, a middle sheet 2450 is positioned between the first core sheet 906a and the second core sheet 906b.

Figure 23:
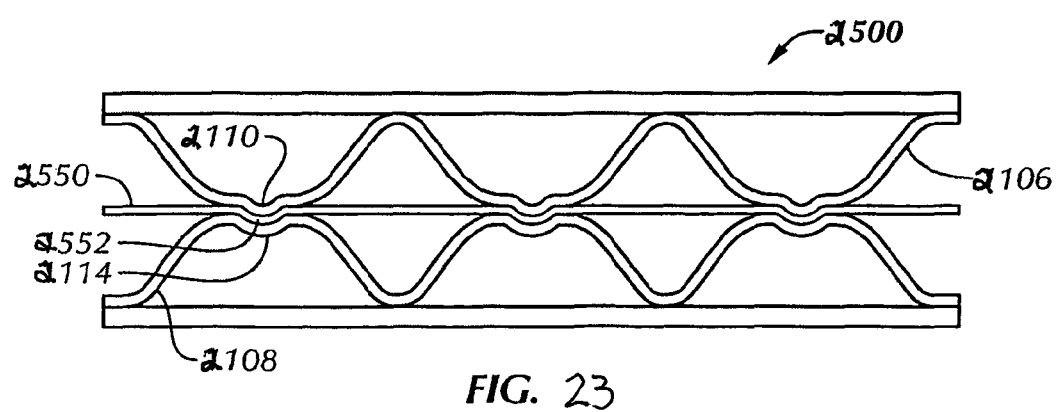
FIG. 23 is a cross-sectional view of a double cell sandwich structure comprising a middle sheet according to another embodiment of the present invention.

FIG. 23 illustrates a cross-sectional side view of a further embodiment of a double cell sandwich structure 2500 having a middle sheet, in accordance with another embodiment of the present invention. Some parts of the structure 2500 are identical to those of the previously described embodiments, and like reference numerals have been used for like parts as appropriate. As shown in FIG. 23, a dimpled middle sheet 2550 is positioned between the first core sheet 2106 and the second core sheet 2108. The dimpled middle sheet 2550 has dimples 2552 formed at locations corresponding to the locations of the bulges 2110 of the first core sheet 2106 and the dimples 2114 of the second core sheet 2108.

It is understood that sheets forming the respective structures 2400 and 2500 may be bonded or brazed together to facilitate gripping using the bonding or brazing techniques described in this disclosure.

The double cell sandwich structures provide many advantages. For example, it is believed that embodiments of double cell sandwich structures provide many of the advantages of the single cell structures; yet double cell structures can provide even more strength and further reduce dimpling and wrinkling on the surface of the structure during and after forming of the sandwich structure. Embodiments using a middle sheet between the core sheets can strengthen the structure even further.

Figure 24A:
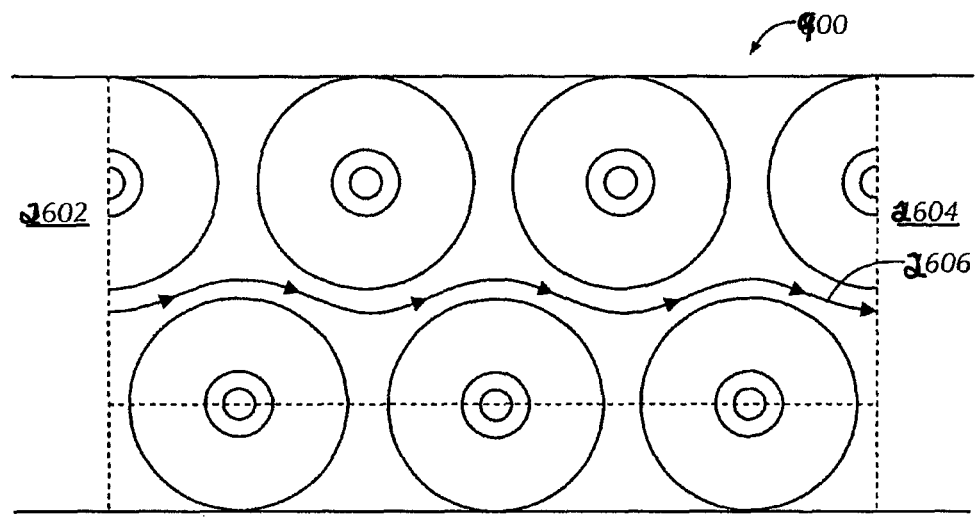
FIG. 24a is a top view of a sandwich structure depicted in FIG. 16 and adapted to support a fluid flow according to one embodiment of the invention.

FIG. 24a is a top view of the sandwich structure 900 depicted in FIG. 16 and adapted to support a fluid flow according to one embodiment of the invention. As evidenced by the figure, a fluid enters the sandwich structure from an inlet path 2602. In preferred embodiments, the inlet path 2602 comprises any structure, component, or mechanism adapted to facilitate the transmission of the fluid to an adjoining region. This includes, without limitation, pipes, tubes, hoses, channels, and other such conduits. Note that the width of the inlet path 2602 need not necessarily equal the width of the sandwich structure 900 according to many embodiments of the present invention. Also, according to certain embodiments, multiple inlet paths 2602 may connect with the sandwich structure 800 at one or more discrete regions.

As used herein, the term "fluid" collectively refers to any liquid or gas that can flow through a conduit. The fluid may be any desired fluid. In many embodiments, the fluid comprises a coolant adapted to reduce temperatures associated with the metal sheet sandwich structure and/or one or more serviceable regions of a larger system. In some embodiments, the coolant is adapted to interact with heat generated by external forces (e.g., heat emanating from an engine) that has been thermally conducted across one or more regions of the metal sandwich structure. Note also that the coolant may comprise any solution or heat-transfer medium (e.g. water) as well as various chemical additives (e.g. corrosion inhibitors, anti-freezes, etc). This includes, without limitation, solutions comprising ethylene glycol, diethylene glycol, and/or propylene glycol.

In other embodiments, the fluid comprises a refrigerant adapted to maintain at least a portion of a system under a designated temperature threshold. This may be used with various thermal devices such as refrigerators, freezers, and/or air conditioning systems. In many embodiments, the refrigerant comprises one or more compounds adapted to undergo phase changes from gas to liquid and from liquid to gas. Any chemical solution or composition may be used for this purpose, including, for example, ahydrous ammonia, liquefied propane gas, and/or Freon.

In some embodiments, the fluid comprises one or more chemical retardants (e.g. fire retardants and/or flame retardants). The retardants may comprise any substance, solution, or composition adapted to resist burning, withstand heat, and/or prevent the spread of conflagration. This includes, without limitation, fire-retardant gels, aluminum hydroxide gels, absorbent polymers, bromine and/or chlorine solutions.

In still other embodiments, the fluid comprises a fuel (e.g., automobile or aircraft) or other composition adapted to be burnt, altered or otherwise processed for the purpose of obtaining energy. Note that any fuel may be used for this purpose, including, for example, alcohol fuels (e.g. ethanol, methanol, butanol, etc.), diesel, biodiesel, gasoline, and other petroleum-derived mixtures. In some embodiments, the fuel is adapted to flow from a tank or reservoir to a fuel injector or the engine of a vehicle. In other embodiments, the fuel is adapted to service to one or more reactors.

Figure 24B:
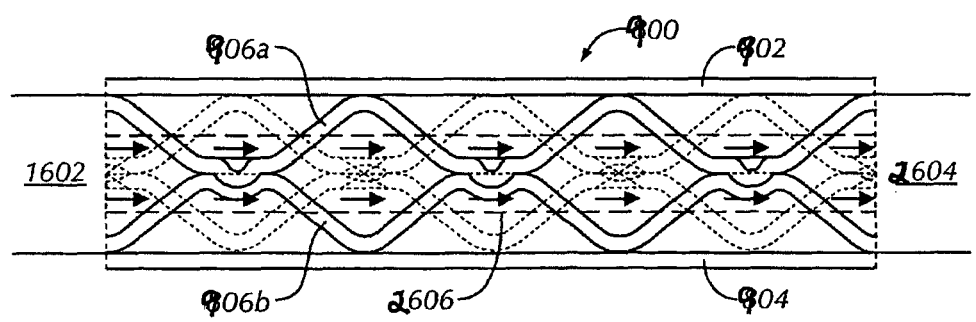

As shown in FIG. 24a, the fluid enters the sandwich structure from an inlet path 2602 and subsequently flows through the cavities of the cells to one or more outlet paths 2604. An approximate path of maximum flow 2606 has been illustrated which can also be seen in the cross sectional view depicted by FIG. 24b. In some embodiments, the fluid is adapted to flow through the outlet path 2604 to a serviceable region (e.g., an engine compartment) and subsequently exit the system. In other embodiments, the fluid is adapted to circulate between the outlet path 1604 and the inlet path 2602. Note that one or more pumps may be used for accomplishing fluid circulation.

In some embodiments, the outlet path 2604 comprises any structure, component, or mechanism adapted to facilitate the transmission of fluid to an adjoining region. This includes, without limitation, pipes, tubes, hoses, channels, and other such conduits. Like the inlet path 2602, the width of the outlet path 2604 need not necessarily equal the width of the sandwich structure 900 according to many embodiments of the present invention. Also, according to some embodiments, multiple outlet paths 2604 may connect with the sandwich structure 900 at one or more discrete regions.

Figure 29A:
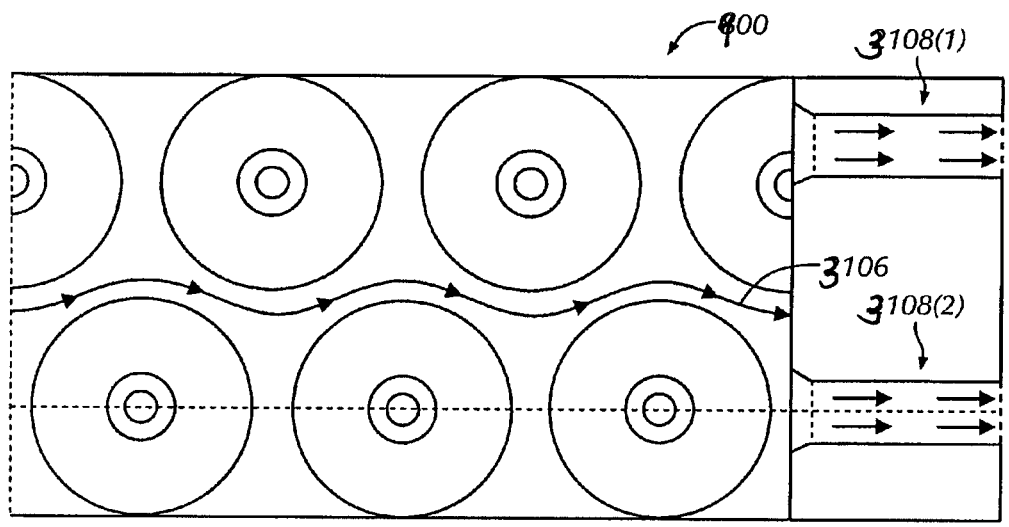
FIG. 29a is a top view of a nozzle system adapted for use with various embodiments of the present invention.
Figure 29B:
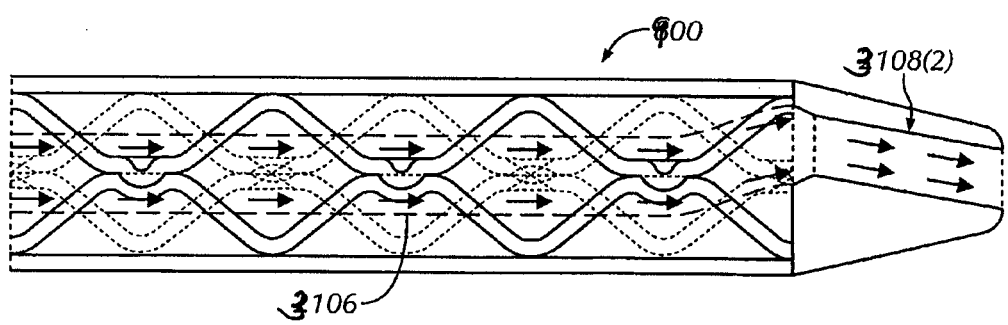

FIG. 29a is a top view of a nozzle system adapted for use with various embodiments of the present invention. FIG. 29b is a cross-sectional view of the nozzle system depicted in FIG. 29a. An approximate path of maximum flow 3106 has been indicated in both figures.

As seen in FIG. 29a, a series of nozzles 3108 are adapted to eject fluid from the system, thus serving as outlet paths for fluid flowing through the metal sheet sandwich structure.

Note that any nozzle type may be used for this purpose, including, for example, jet nozzles, high velocity nozzles, spray nozzles and/or shaping nozzles.

Additionally, the fluid may be ejected from the system for any number of reasons. This includes improving fluid flow with respect to one or both surfaces of the sandwich, as a device of reducing noise, or as a device of fluid injection. Note that in some embodiments, one or more valves, gaskets, sliding seals or other such devices may be used to regulate levels of fluidic outflow.

Figure 25:
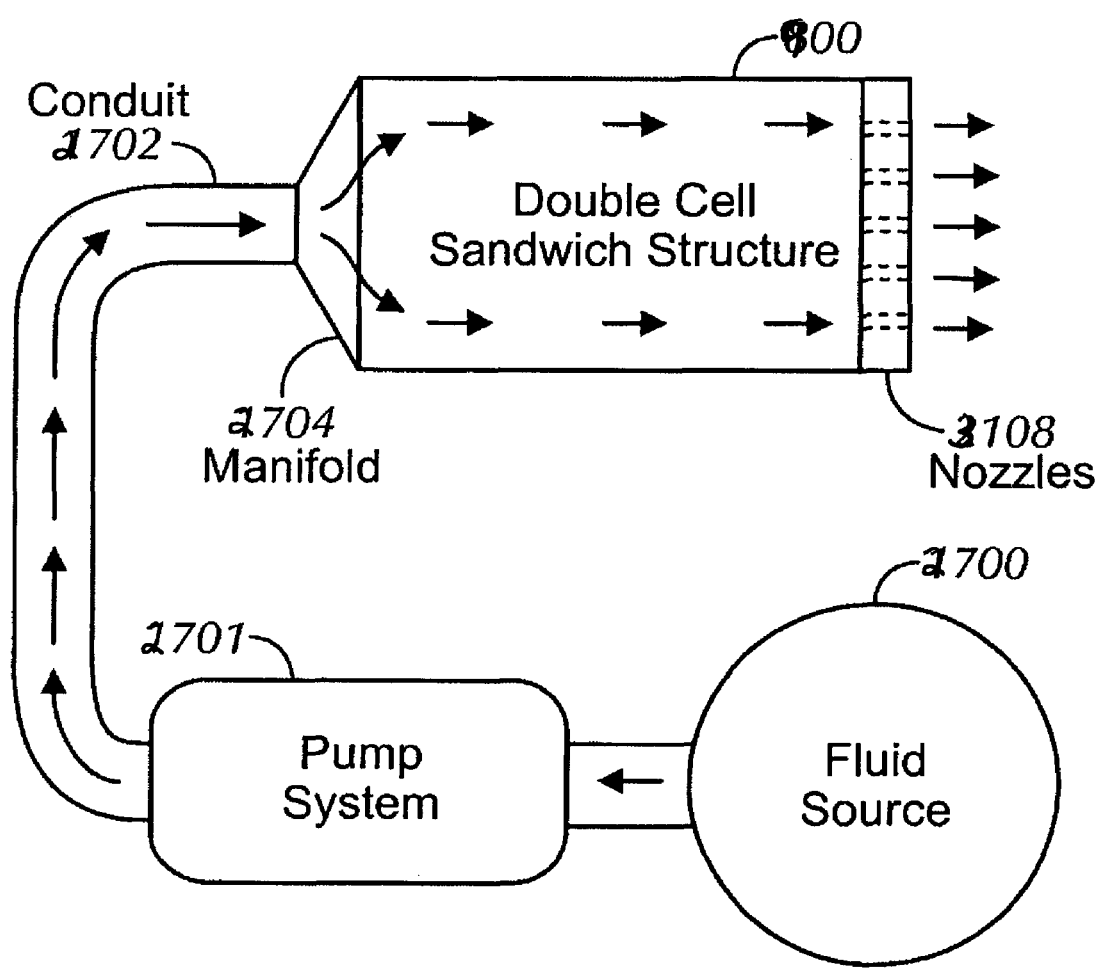
FIG. 25 is a block diagram of a system for pumping fluids through the cavities of the cells of a sandwich structure according to one embodiment of the invention.

FIG. 25 is a block diagram of a system for pumping fluids through the cavities of the cells of a sandwich structure according to one embodiment of the invention. According to the embodiment depicted by the figure, the sandwich core structure is identical to the structure 900 described above with respect to FIG. 16.

A fluid source 2700 initially provides fluid to a pump system 2701. In preferred embodiments, the pump system 2701 comprises any type of structure or mechanism adapted to convert a lower pressure flow to a higher pressure flow. Any suitable pump or combination of pumps may be used for this purpose, including, for example, rotodynamic pumps (e.g. centrifugal pumps), positive displacement pumps (e.g. reciprocating pumps), and/or kinetic pumps. Additionally, the pump system 2701 may include one or more fluid reservoirs (not shown) adapted to store a designated quantity of fluid.

As shown by the figure, the pump system 2701 pumps fluid through a conduit 2702 coupled to a first end of the sandwich structure 800 via an interfacing manifold 2704. Optionally, one or more nozzles 3108 may serve as outlet paths for ejecting fluid received from the sandwich structure 900.

Figure 26A:
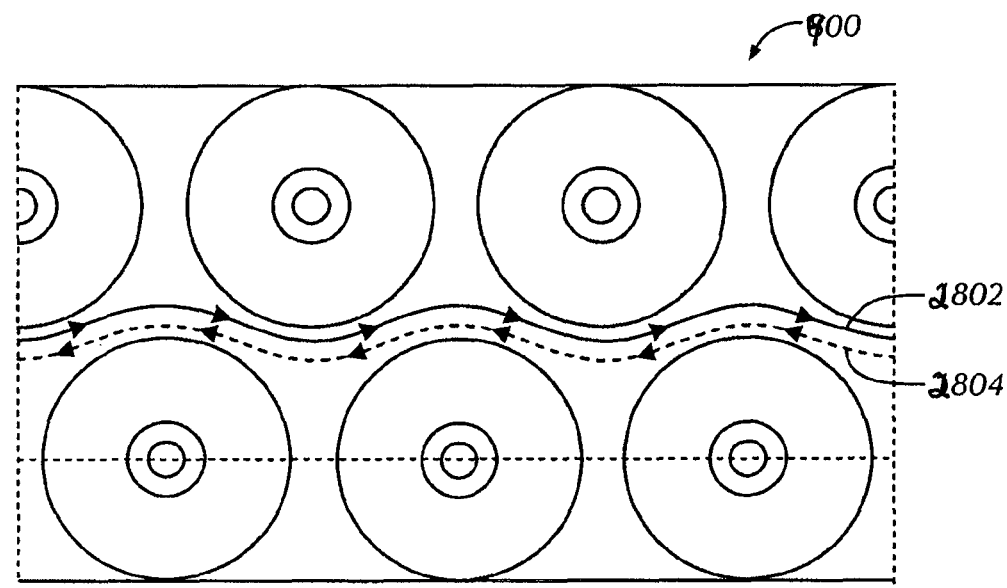
FIG. 26a is a top view of a sandwich structure adapted to support a fluid flow according to another embodiment of the present invention.
Figure 26B:
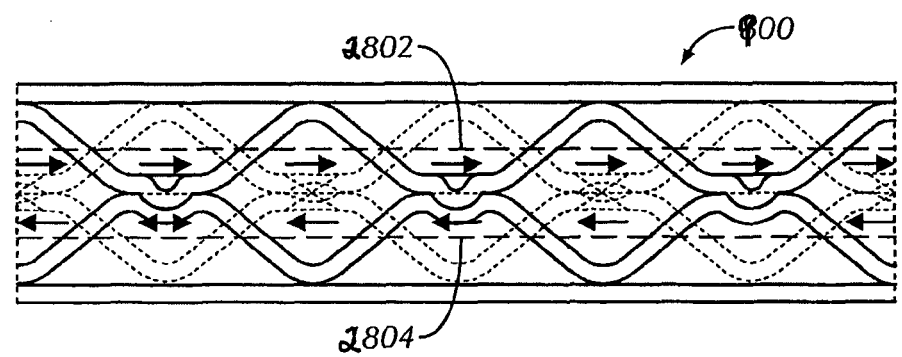

FIG. 26a is a top view of a sandwich structure adapted to support a fluid flow according to another embodiment of the present invention. FIG. 26b is a cross-sectional view of the sandwich structure depicted in FIG. 26a.

As evidenced by FIG. 26b, a fluid flows through the cavities of the top cells of the sandwich structure and returns through the cavities of bottom cells in an opposing or differing direction. Both an approximate path of maximum hot fluid flow 2802 and an approximate path of maximum cold fluid flow 1804 have been indicated in the figures.

In many embodiments, the fluid flowing in the first direction possesses different characteristics, properties, or features than the fluid flowing in the second direction. For example, in the embodiment depicted by FIGS. 26b, the fluid flowing through the cavities of the top cells possesses a higher temperature than the fluid flowing through the cavities of the bottom cells.

In other embodiments, the fluids also comprise different densities, viscosities, and/or chemical compositions. For example, fluid may be treated, filtered, or processed at a remote region of a system and subsequently returned via the same sandwich structure. Note that in some embodiments, the fluid flows are insulated from each other and adapted to flow through separate transmission channels. For example, in one embodiment, a fifth layer of metal situated at the core of the sandwich divides the set of top cavities from the set of bottom cavities, thus separating the flows. In other embodiments, the fluids may interact with each other at one or more interfacing regions before flowing to a corresponding outlet path.

In some embodiments, different fluids (e.g. a fuel and an oxidizer) flow in the same direction through cavities of the top and/or bottom cells of the structure. In certain variants, the different fluids enter a respective layer of the metal sandwich structure from separate inlet regions. In other variants, the fluids enter the structure at the same inlet region but arrive there via separate conduits.

Figure 27:
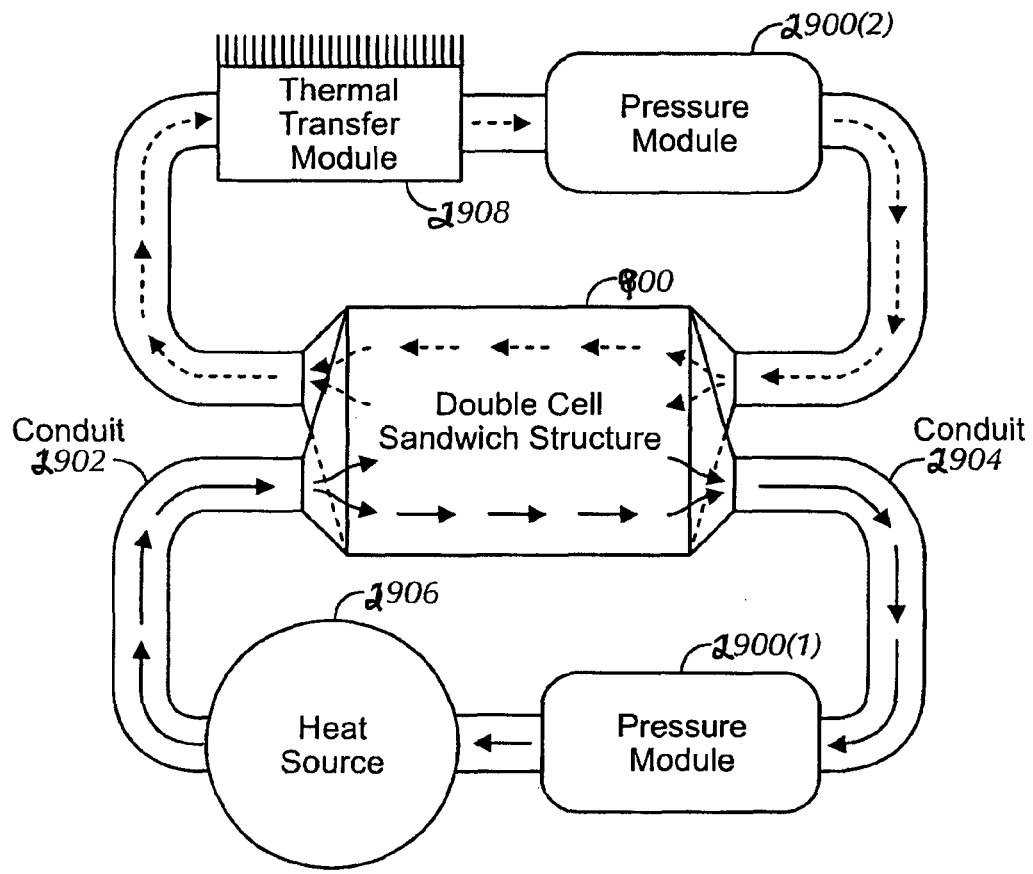
FIG. 27 is a block diagram of a heat exchanger according to one embodiment of the present invention.

FIG. 27 is a block diagram of a heat exchanger according to one embodiment of the present invention. A set of pressure modules 2900(1) and 2900(2) are each adapted to convert a low pressure flow to a high pressure flow. Any device or mechanism known in the art can be used for accomplishing this purpose, including, for example, pumps (e.g. rotodynamic, positive displacement, kinetic, etc.) and/or compressors (e.g. reciprocating, rotary, centrifugal, axial, etc.). Note that the selection of pressure modules 2900 may depend in part upon the substance or substances expected to flow through that respective module (e.g., liquid or gaseous substances).

The pressure module 2900(1) is adapted to transmit a first substance toward a heat source 2906 or heat emanating device (e.g. the engine of an automobile). In many embodiments, the first substance comprises a solution or composition adapted to receive heat from the heat source 2906 (for example, coolant and/or antifreeze). The first substance is then transmitted via a first conduit 2902 to the upper layer of the metal sandwich sheet structure 900.

A second substance flowing in a different direction is adapted to receive heat from the first substance, thereby cooling it. In some embodiments, the second substance directly interacts with the first substance at a number of designated regions. In other embodiments, the substances are divided so that they never directly interact. This may be accomplished in a variety of device, for example, as by one or more metal sheets interspersed between the higher and lower layers of the metal sandwich structure (e.g., at the core of the structure). In preferred embodiments, the divider is selected so as maximize surface area between the two substances, while minimizing resistance to flows within the exchanger.

As the second substance exits the sandwich structure 900 via the lower layer, it is transmitted to a thermal transfer module 2908. Note that any type of device adapted to transfer thermal energy may be used for this purpose, including, for example, radiators and/or convection devices. In preferred embodiments, the thermal transfer module 2908 absorbs heat within the second substance and emits the heat externally. After the second substance is cooled, it is recycled through the metal sandwich sheet by the pressure module 2900(2). The first substance likewise returns to the heat source via the conduit 2904, and the process subsequently repeats.

Figure 28:
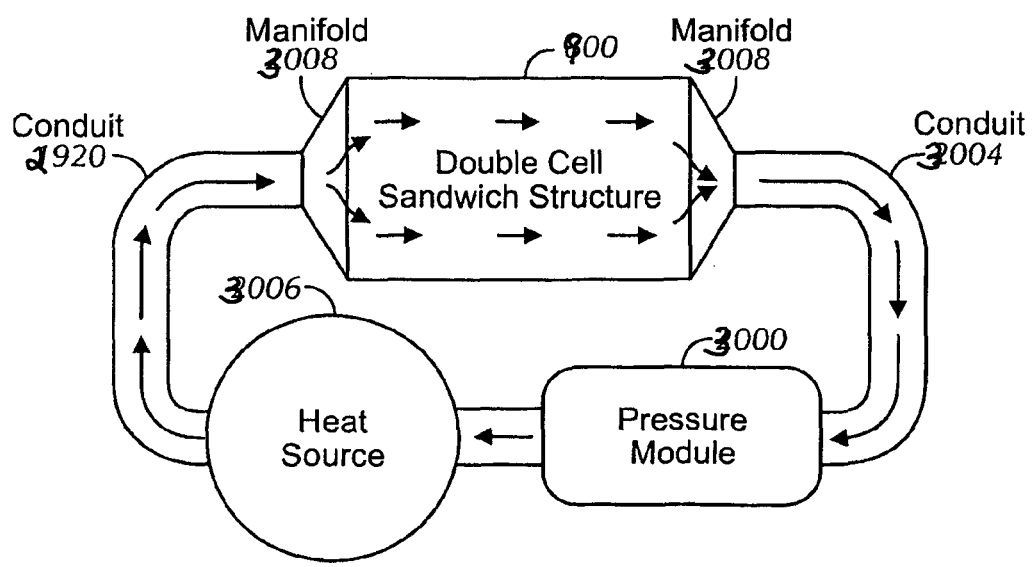
FIG. 28 is a block diagram of a thermal transmission system according to one embodiment of the present invention.

FIG. 28 is a block diagram of a thermal transmission system according to one embodiment of the present invention. As before, a pressure module 3000 is adapted to convert a low pressure flow to a high pressure flow. Any device or mechanism known in the art may be used for accomplishing this purpose, including, for example, pumps (e.g. rotodynamic, positive displacement, kinetic, etc.) and/or compressors (e.g. reciprocating, rotary, centrifugal, axial, etc.). Note that the selection of the pressure module 3000 may depend in part upon the substance or substances expected to flow through that respective module (e.g., liquid or gaseous substances).

The substance is transmitted toward a heat source 3006 or heat emanating device (e.g. the engine of an automobile). In preferred embodiments, the substance comprises a solution or composition adapted to receive heat from the heat source 3006 (for example, coolant and/or antifreeze) for transmission to a remote region. The substance is then transmitted via a first conduit 3002 to the metal sandwich structure 900 via an interfacing manifold 3008.

In many embodiments, the metal sheet sandwich structure is adapted to absorb heat stored within the transmitted substance as it flows to a distal region of the sandwich structure. In many embodiments, the absorbed heat is thermally conducted for external emissions. In this regard, the metal sheet sandwich structure 900 serves to transfer heat out of the system, thus acting as a radiator. As the substance is cooled, it returns to the pressure module 3000 via a second conduit 3004, and the process then repeats.

Various preferred embodiments of the invention have been described above. However, it is understood that these various embodiments are exemplary only and should not limit the scope of the invention as recited in the claims below. Various modifications of the preferred embodiments described above can be implemented by those of ordinary skill in the art, without undue experimentation. These various modifications are contemplated to be within the spirit and scope of the invention as set forth in the claims below.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An apparatus for the collection and conversion of light energy comprising:
    a sandwich core structure having a thickness;
    a collector element;
    a concentrator including one or more reflector elements and positioned at an exterior surface of the core;
    at least a first rotation axle rotatably journaled into a bearing or bushing device; and
    a load bearing joint incorporated into the rotation axle, the first rotation axle and bearing joint supporting the core structure for rotation; and
    wherein, the core structure is a non-honeycomb structure made of cells pointing in the same direction and has first and second outer layers that sandwich an interior single core, wherein $$\rho^* = \frac{\left(w + \frac{h}{\sin\alpha}\right)t}{\left(w + \frac{h}{\tan\alpha}\right)(h+t)}$$

where: $0.01 < \rho^* < 0.2$
and:

$$w \leq \frac{h}{2}$$

t is the thickness of the sandwich core structure, p* is the measure of the relative density and h is the height of the core.

2. The apparatus of claim 1, wherein a plurality of reflector elements are included.

3. The apparatus of claim 1, wherein the reflector element is coupled to the collection element by a connection mode selected from at least one of, fixed, adjustable, hinged, rotatable, and remotely controllable.

4. The apparatus of claim 1, further comprising,
    a tracking device that tracks a position of a source of incident light and adjusts a position of the apparatus with respect thereto to optimize collection of light energy.

5. The apparatus of claim 1, wherein the reflector element is selected from at least one of, mirrors, reflective plastic materials, reflective metal materials and elements enclosing reflective particles suspended in a fluid, gel and solid medium.

6. The apparatus of claim 1, wherein the collector element is selected from at least one of, photovoltaic cells, photovoltaic panels, coiled tubing containing a heatable fluid, light pipe, solar oven, water heater, hot water-powered turbine, and devices suitable for recharging batteries.

7. The apparatus of claim 1, wherein the core structure is a formable sandwich sheet material with a core structure positioned between first and a second sheets.

8. The apparatus of claim 7, wherein the sandwich sheet material includes at least one or more corrugated layers.

9. The apparatus of claim 1, wherein the interior single core has one direction of corrugation.

10. The apparatus of claim 7, wherein, the core structure has first and second outer layers that sandwich an interior core with at least first and second cores with multiple directions of corrugation.

11. The apparatus of claim 10, wherein, the core structure has two or more cores of periodic cells with alternating cells pointing in the same direction.

12. The apparatus of claim 7, wherein, the core structure has two or more cores of periodic cells with alternating cells pointing in opposing directions.

13. The apparatus of claim 7, wherein, the core structure has two or more cores of periodic separated by a solid or semi-solid sheets that do not include cells.

14. The apparatus of claim 7, wherein the first and second sheet layers and the at least one corrugated layer of the core structure are parallel relative to each other and create a sandwich sheet material that is formable and has an open cellular core structure.

15. The apparatus of claim 10, wherein, $$2 \geq D_2/D_1 \geq 1$$

$$\tfrac{2}{3} > h/D > \tfrac{1}{3} \text{ where } D = \min(D_1, D_2)$$

$$0.01 < t/(h+t) < 0.2$$

Where D1 is the distance between centers of cells in one core layer, D2 is a distance between cells in adjacent core layers, h is the height of a core layer and t is a thickness of the sandwich core material.

16. The apparatus of claim 1, wherein the sandwich core structure includes a flow through channel that provides for cooling the collector element.

17. The apparatus of claim 16, wherein cooling of the collector element reduces distortion from heating and thermal expansion.

* * * * *